(12) United States Patent
Orofino, II

(10) Patent No.: US 8,839,100 B1
(45) Date of Patent: Sep. 16, 2014

(54) UPDATING INFORMATION RELATED TO DATA SET CHANGES

(75) Inventor: Donald Paul Orofino, II, Sudbury, MA (US)

(73) Assignee: The Mathworks, Inc., Natick, MA (US)

(*) Notice: Subject to any disclaimer, the term of this patent is extended or adjusted under 35 U.S.C. 154(b) by 1157 days.

(21) Appl. No.: 11/698,395

(22) Filed: Jan. 26, 2007

(51) Int. Cl.
*G06F 17/00* (2006.01)
*G06F 17/22* (2006.01)
*G06F 9/44* (2006.01)

(52) U.S. Cl.
CPC ............ *G06F 17/2288* (2013.01); *G06F 8/75* (2013.01); *G06F 8/34* (2013.01)
USPC ........................ 715/255; 715/205; 715/229

(58) Field of Classification Search
CPC .......... G06F 17/2288; G06F 8/75; G06F 8/34
USPC ................ 715/255, 205, 229; 707/999.01
See application file for complete search history.

(56) References Cited

U.S. PATENT DOCUMENTS

| | | | | |
|---|---|---|---|---|
| 3,676,856 A | * | 7/1972 | Manly | 715/209 |
| 5,063,495 A | * | 11/1991 | MacPhail | 715/205 |
| 5,706,510 A | * | 1/1998 | Burgoon | 1/1 |
| 5,761,684 A | * | 6/1998 | Gibson | 715/210 |
| 5,784,057 A | * | 7/1998 | Alimpich et al. | 715/781 |
| 5,890,164 A | * | 3/1999 | Nielsen | 1/1 |
| 5,978,828 A | * | 11/1999 | Greer et al. | 709/224 |
| 6,070,177 A | * | 5/2000 | Kao et al. | 715/207 |
| 6,208,345 B1 | * | 3/2001 | Sheard et al. | 715/853 |
| 6,208,955 B1 | * | 3/2001 | Provan et al. | 703/20 |
| 6,219,586 B1 | * | 4/2001 | Sakai | 700/182 |
| 7,043,415 B1 | * | 5/2006 | Dunlavey et al. | 703/12 |
| 7,130,760 B2 | * | 10/2006 | Ilic | 702/176 |
| 7,350,189 B1 | * | 3/2008 | Bartlett | 717/104 |
| 7,437,668 B2 | * | 10/2008 | Slein | 715/255 |
| 7,619,991 B2 | * | 11/2009 | Wylie et al. | 370/254 |
| 7,668,887 B2 | * | 2/2010 | Vella | 707/706 |
| 7,694,217 B2 | * | 4/2010 | Croft et al. | 715/229 |
| 2001/0056437 A1 | * | 12/2001 | Allen et al. | 707/203 |
| 2002/0073114 A1 | * | 6/2002 | Nicastro et al. | 707/500 |
| 2002/0080174 A1 | * | 6/2002 | Kodosky et al. | 345/762 |
| 2003/0149650 A1 | * | 8/2003 | Yeh et al. | 705/35 |
| 2003/0159129 A1 | * | 8/2003 | Frank et al. | 717/116 |
| 2003/0187823 A1 | * | 10/2003 | Ahl et al. | 707/1 |
| 2003/0193994 A1 | * | 10/2003 | Stickler | 375/150 |
| 2004/0031015 A1 | * | 2/2004 | Ben-Romdhane et al. | 717/107 |
| 2004/0044990 A1 | * | 3/2004 | Schloegel et al. | 717/113 |
| 2004/0056908 A1 | * | 3/2004 | Bjornson et al. | 345/968 |
| 2004/0089141 A1 | * | 5/2004 | Georges et al. | 84/609 |
| 2004/0220953 A1 | * | 11/2004 | Allen et al. | 707/100 |
| 2004/0230944 A1 | * | 11/2004 | Murphy et al. | 717/105 |
| 2005/0096894 A1 | * | 5/2005 | Szpak et al. | 703/13 |

(Continued)

*Primary Examiner* — Stephen Hong
*Assistant Examiner* — Marshon Robinson
(74) *Attorney, Agent, or Firm* — Harrity & Harrity, LLP

(57) ABSTRACT

Exemplary embodiments update a revision value related to a data set that includes data. The revision value indicates whether a revision event has occurred with respect to the data set. Exemplary embodiments identify whether a change associated with the data qualifies as a revision event in the data set. The identification is based on a configurable requirement. The revision value is specified based on the identification to provide a user with an indication of whether the revision event has occurred.

26 Claims, 17 Drawing Sheets

(56) References Cited

U.S. PATENT DOCUMENTS

| | | | |
|---|---|---|---|
| 2005/0251738 A1* | 11/2005 | Hirano et al. | 715/514 |
| 2005/0257195 A1* | 11/2005 | Morrow et al. | 717/109 |
| 2006/0095841 A1* | 5/2006 | Oikawa | 715/531 |
| 2006/0168173 A1* | 7/2006 | Clemm et al. | 709/223 |
| 2006/0200799 A1* | 9/2006 | Wills et al. | 717/109 |
| 2006/0212821 A1* | 9/2006 | Charles et al. | 715/764 |
| 2006/0242570 A1* | 10/2006 | Croft et al. | 715/517 |
| 2007/0260996 A1* | 11/2007 | Jakobson | 715/781 |

* cited by examiner

UPDATING INFORMATION RELATED TO DATA SET CHANGES

BACKGROUND

Conventional computing environments may provide a mechanism for associating a time or date (hereinafter "revision date") artifact into a data set. Many computing environments purport to provide a user with a revision date artifact that reflects meaningful changes to the data set (e.g., changes that are meaningful from the perspective of a user); however, these conventional computing environments may provide the user with a revision date artifact that reflects, for example, the last time the file that contains the data set was saved, opened or printed. Conventional computing environments may provide the user with these revision date artifacts even though these artifacts may not represent meaningful changes to the data set from the user's perspective.

Conventional revision dating techniques may be used in several types of computing environments, such as document processing environments and/or revision control system (RCS) environments. For example, document processing environments, such as Microsoft Word®, Microsoft PowerPoint® or Microsoft Excel® from Microsoft Corporation of Redmond, Wash. offer several alternatives for incorporating a time/date into a document (e.g., a text document, a slide show, or a spreadsheet). The times/date information may be incorporated as static text (i.e., manually entered by a user) or may be programmatically updated when a document is opened or printed (e.g., via an object).

Further, some document processing environments provide users with an option to track changes in a document. When the option is enabled, a user can track the addition or deletion of text in the document using an indicator associated with the changes in the document. In some cases, the user can decide which changes in the document are indicated using a filter operation that is provided by the document processing environment. For example, the user can decide that changes associated with user A should be indicated, while changes associated with all other users should not be indicated. These filtering operations hide indicators associated with changes that the user does not wish to view. The hidden indicators associated with these changes still exist in the document, but are simply filtered out so they are not displayed to the user.

RCS environments may include known approaches for maintaining a repository of data sets. A RCS environment may provide a mechanism for tracking revisions and changes to data sets by allowing a user to check data sets into the RCS environment. When a data set is checked into the RCS environment, the data set may be assigned a time, date, and/or revision object. Subsequently, the data set may receive an update to the time, date and/or revision object when the data set is checked into the RCS environment. RCS environments, however, may not interpret data in the data set because RCS environments may lack knowledge about formats of the data sets, and therefore may not identify a revision or may improperly identify that a revision has occurred when no revision was made to the data set from the perspective of a user.

SUMMARY

In one aspect, a method of updating a revision value related to a data set that includes data is disclosed, where the revision value indicates whether a revision event has occurred with respect to the data set. The method includes identifying whether a change associated with the data qualifies as a revision event in the data set. The identifying is based on a configurable requirement. The method further includes specifying the revision value based on the identifying.

In another aspect, a computer-implemented system is disclosed that includes a data set and a computing environment, where the data set includes data. The computing environment is provided to revise the data, monitor the data to determine whether revision events occur with respect to the data, and to specify a revision value that indicates whether a revision event has occurred. The revision value updates when it is determined that a revision event occurred in the data set.

In yet another aspect, a medium that holds instructions that are executable using a computing system is disclosed. The instructions enable identifying whether a change associated with data qualifies as a revision event in a data set, where, the identifying is based on a configurable requirement. The instructions also enable specifying a revision value based on the identifying.

In still another aspect, a computing device implemented method is disclosed. The method includes identifying when a revision event occurs in a data set based on a configurable requirement. The method also includes updating a revision value that indicates when the revision event occurred.

In a further aspect, a medium that holds instructions that are executable using a computing system is disclosed. The instructions enable identifying when a revision event occurs in a data set based on configurable requirement. The instructions also enable updating a revision value that indicates when the revision event occurred.

In still a further aspect, a method in a computing device is disclosed. The method includes accessing a graphical model and identifying a configurable requirement to be satisfied before a change to at least a portion of the graphical model qualifies as a revision event. The method also includes determining whether the change qualifies as a revision event based on the configurable requirement.

In an additional aspect, a medium that holds instructions that are executable using a computing system is disclosed. The instructions enable accessing a graphical model and identifying a configurable requirement to be satisfied before a change to at least a portion of the graphical model qualifies as a revision event. The instructions also enable determining whether the change qualifies as a revision event based on the configurable requirement.

BRIEF DESCRIPTION OF THE DRAWINGS

The accompanying drawings, which are incorporated in and constitute a part of this specification, illustrate one or more exemplary embodiments and, together with the description, explain the invention. In the drawings.

DETAILED DESCRIPTION

Figure 1A:
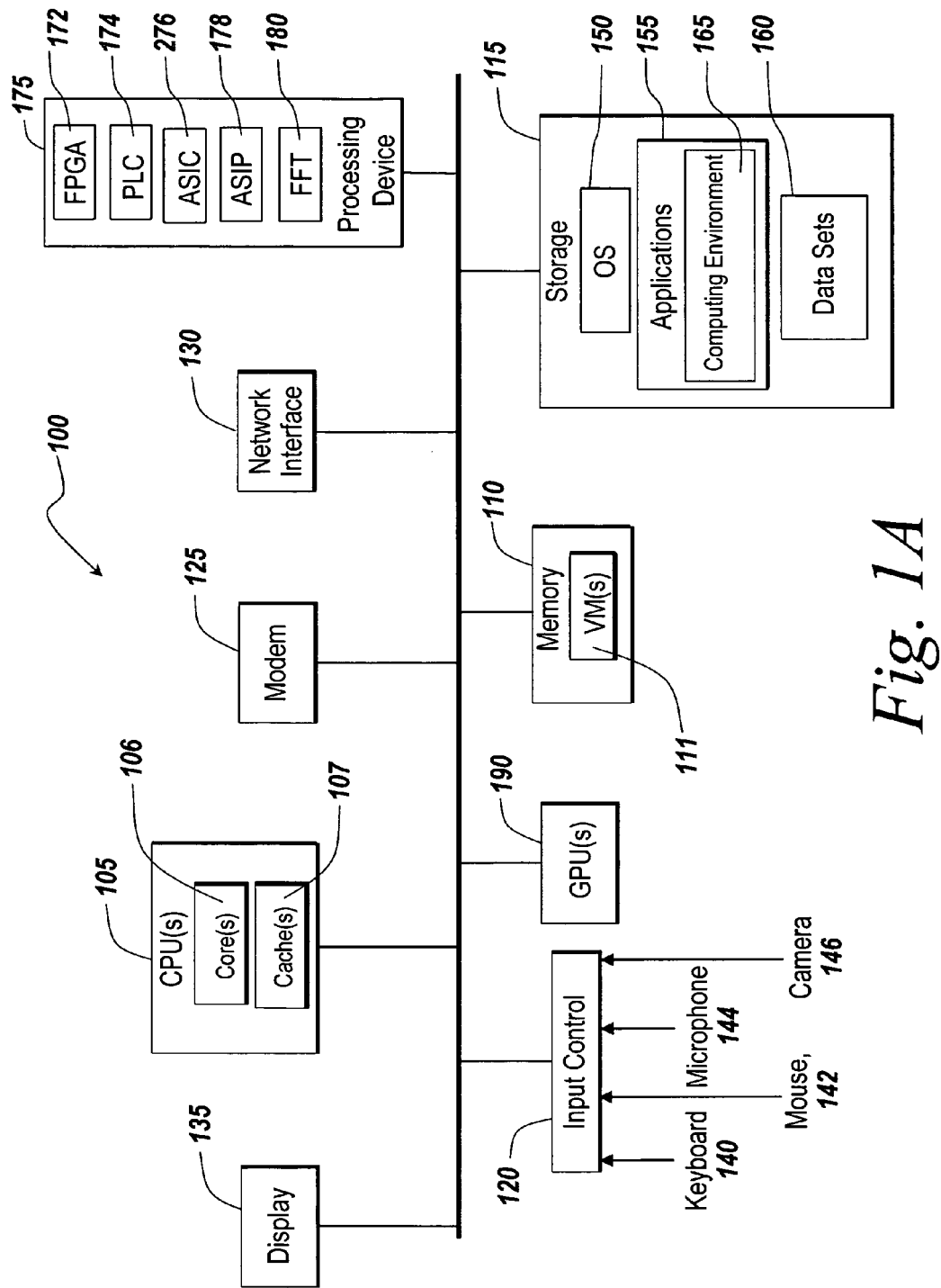
FIG. 1A depicts an exemplary computing device suitable for practicing exemplary embodiments.

As used herein, a "data set" refers to any collection of data. The data set may contain many forms of data and may include, for example, data in a document and/or data in a model. A data set may be, for example, a file, such as a serialization artifact of a document or a model.

As used herein, a "revision event" refers to a change in a data set that satisfies a given criteria (e.g., a requirement). A criteria for a revision event may be configured by a user (e.g., via a user input), and/or by another technique (e.g., determined by a device, another person, from information in a document, etc.). In one or more exemplary embodiments, a revision event may represent a change to a data set that is meaningful from the perspective of a user.

As used herein, a "revision value" refers to a value that may be used to identify that a revision event has occurred with respect to a data set. A revision value may identify when a particular revision event occurs. In one or more exemplary embodiments, a revision value may include a date value (hereinafter "date"), a time value (hereinafter "time"), a name, a letter, a number, a symbol, etc. In addition, a revision value may include other revision information, such as what change resulted in the revision event, a location of the change, etc.

As used herein, a "revision manifestation" refers to a visual depiction that may be associated with, based on, or the same as the revision value. A revision manifestation may provide a user with an indication of when a revision event has occurred. In one or more exemplary embodiments, a revision manifestation may include the revision value as well as any other information related to the revision event.

As used herein, "window size" refers to a display area associated with a data set. In one or more exemplary embodiments, window size may refer to a region of a display surface associated with a display device that has length dimension and a width dimension associated therewith. Implementations of windows used herein may be displaced within a display surface (e.g., based on user inputs). In one embodiment, information related to the window size may be stored in the data set. In another embodiment, window size may qualify as a revision event alone or in combination with other information related to the data set.

As used herein, "window position" refers to the position of a window or display area within a viewable area, such as a display surface.

Many computing applications can benefit from techniques and/or mechanisms that allow revision events (e.g., revision events that are meaningful to a user of the application) to be identified. In exemplary embodiments, an object may be used to correctly reflect a revision event (e.g., the time or date of the most recent meaningful revision) associated with the data. Identifying meaningful revision events is important to many software change processes. For example, the date of a last meaningful change to a data set may be important to assess how long it has been since data in the data set has been revised. A user may want to know, for example, the last change that occurred in a description of a workflow process, in specifications of a manufacturing system, or in a computational process or algorithm. Revision events can be used to provide the user with these types of information about a data set.

Exemplary embodiments may provide a computing environment that may provide a revision value. The revision value may be inserted into a data set as a revision manifestation that is visible to a user. The data set may be, for example, a file, such as a document file or a model file. A file may be a serialization artifact. A serialization artifact uses serial streams such as a byte stream to represent a data set. In one implementation, a user may determine that a data set includes up-to-date information based on the revision value. For example, a revision value may assure a user that a model that represents a system has not been revised after the model has been implemented, that a last revision event of the model is documented (e.g., has been saved), etc.

The revision event may represent changes to the data in the data set that affect how the data functions, behaves, simulates, appears, is interpreted, etc. In addition, a revision event may relate to an addition, deletion, modification, insertion, etc., of data in the data set. The revision event may be initiated by the computing environment, a user, and/or any device that interfaces with a computing device that is associated with the computing environment.

Revision events may be used with substantially any type of file and may include substantially any type of information, such as information determined by a user, by an application, by a device, etc. For example, a revision event may be associated with a software application that implements a graphical modeling environment. A user of the application may decide that changes to the size of graphical elements within a model do not constitute meaningful revisions. As a result, changes to the size of graphical elements may not cause an update or occurrence of a revision event. In contrast, the user may determine that changes to parameters associated with graphical elements (e.g., changes to equations, variables, data values, etc.) do constitute meaningful revision events. The exemplary embodiment may update and/or initiate an occurrence of a revision event when changes to parameters for graphical elements are detected.

As another example, conventional RCS environments may not interpret the data in the data set. This can be because an RCS environment's lack of knowledge about formats of the data sets. There may be, for example, a change to the content of a data set that may not be considered a meaningful revision to the data set. In this case, the application that produced the data set may properly determine that the change to the data in the data set does not qualify as a revision event, but conventional RCS environments may not be able to make such a determination. In addition, conventional RCS environments can require two separate applications, an application that may produce the file and a conventional RCS to track revisions to the file. Conventional RCS environments may require an explicit check-in of a primary artifact in order to offer revision tracking capability. While the revisions are tracked by conventional RCS environments, the primary artifact may not receive the benefit of updated revision artifacts.

Computing environments, as described in connection with aspects of exemplary embodiments, may include, but are not limited to, a document processing environment, such as MS Word®, MS Excel®, MS PowerPoint®, etc., a modeling environment, such as Simulink® software, Stateflow® software, MATLAB® software, LabVIEW® or MATRIXx from National Instruments, Inc., Mathematica® from Wolfram Research, Inc., Maple™ from Maplesoft, Dymola from Dynasim AB, Extend from Imagine That, Inc., Scilab™ and Scicos from The French National Institution for Research in Computer Science and Control (INRIA), SCADE™ from Esterel Technologies, Inc., Eclipse from the Eclipse Foundation, applications derived from any of the above environments, etc.

The computing environment may monitor some or all of a data set to determine when data in the data set is revised. Based on the monitoring, the computing environment may determine whether a revision event has occurred with respect to the data set. The computing environment may enable the revision value(s) to be programmatically updated. Updated revision value information may allow a user to determine whether the data in the data set includes the most recent (i.e., most up-to-date) information.

Exemplary embodiments may provide a graphical identifier that identifies sections of the data set that have been revised. Graphical identifiers may allow a user to view portions of the data set that have changed without requiring that the user compare the data set to previous revisions of the data set and/or that the user compare the data set to other data sets. Graphical identifiers may also indicate a magnitude of the revision event. For example, the graphical identifier may highlight portions of the data set or may encompass portions of the data set using a border, or other type of indicator, to identify that certain portions of the data set have changed. Graphical identifiers that can be used with exemplary embodiments may include, but are not limited to, words, letters, numbers, symbols, icons, pictures, images, video clips, links, etc.

Exemplary embodiments may store revision information that corresponds to a revision event associated with a data set. Updated revision values and/or corresponding revision event information may be stored and/or accessed by the computing environment, the user, etc. The computing environment may provide an archive that includes the revision values and may archive information corresponding to the revision event. Using the stored information, the computing environment may revert data in the data set to a previous state.

FIG. 1A illustrates an exemplary computing device 100 suitable for practicing exemplary embodiments. Computing device 100 is illustrative and not meant to be limiting. Computing device 100 may take many forms, including but not limited to a personal computer, workstation, server, network computer, quantum computer, optical computer, bio computer, Internet appliance, mobile device, a pager, a tablet computer, etc.

Computing device 100 may include electronic and/or optical components and may include a Central Processing Unit (CPU) 105, memory 110, storage 115, an input control 120, a modem 125, a network interface 130, a display 135, processing device 175 and graphical processing unit 190. CPU 105 controls each component of computing device 100 to provide one or more applications to a user and/or another device. Memory 110 may store instructions and/or data, and may provide the instructions and/or data to CPU 105 so that CPU 105 may operate computing device 100.

Optionally, computing device 100 may include multiple CPUs 105 for executing software loaded in memory 110, and/or for executing other programs for controlling system hardware and/or system software. Each of CPUs 105 may be a single or a multiple core processor 106. The code loaded in memory 110 may run in a virtualized environment, such as in a Virtual Machine (VM) 111. Multiple VMs 111 may be resident on a single processor, such as cores 106. Also, part of the application could be run on processing device 175, which may include, for example, a field programmable gate array (FPGA) 172, a programmable logic controller (PLC) 174, an application specific integrated circuit (ASIC) 176, an application specific instruction-set processor (ASIP) 178, a system-on-chip (SoC) 180, a multiple-processor system on chip (MPSoC) 182, a Fast Fourier Transform (FFT) processing device 184, etc. In alternative implementations, portions of the applications may be run on analog electronic devices. In still other alternative implementations other resources may be used to run part of an application, such as graphics processing units (GPUs) 190.

Storage 115 may contain instructions related to applications, such as software tools for applications operating with computing device 100. Exemplary applications may include a computing environment, such as a document processing environment (e.g., MS Word®, MS PowerPoint®, MS Excel®, etc.) or a modeling environment (e.g., Simulink® software, Stateflow® software, MATLAB® software, etc.). Storage 115 may include code 150 for the operating system (OS) of computing device 100 or code 155 for applications running on the operation system, which may include code 165 for a computing environment (hereinafter referred to as environment 165), such as code for a document processing environment or code for a modeling environment. Storage 115 may also store data sets 160 that may be loaded by the applications. Data sets 160 may be, for example, a serialization artifact, such as a file. Parts of the applications may be stored in CPU cache 107 or memory 110 or they may be stored remotely.

Environment 165 may represent a modeling environment that allows a user to develop, view, execute, generate code from, analyze, etc., graphical models. A graphical model may be, for example, a block diagram, state diagram, data flow diagram, etc.

Environment 165 may generate code from the graphical model based on a code generation process. The code generation process performed by environment 165 may generate code, such as source code, object code, a compiled executable, a library, etc., for forming an executable representation of a graphical model. Code generation may also generate a hardware description language (HDL) or a register transfer language (RTL) representation of a graphical model. An example of a suitable software tool for code generation may include Real-Time Workshop® from The MathWorks, Inc. of Natick, Mass., or any software tool that may be capable of generating executable code, instructions, etc., in a programming language such as Java, Javascript, Python, C, C++, an assembly language, etc.; a hardware description language such as Verilog, VHDL, etc.; RTL; etc.

Figure 1B:
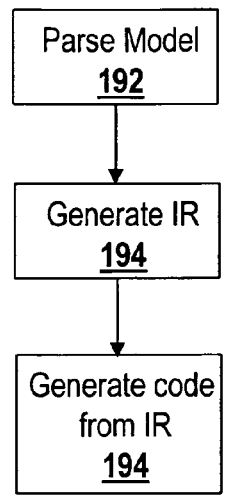
FIG. 1B depicts an exemplary flow diagram for generating code from a model.

FIG. 1B depicts a code generation process that may be implemented by environment 165 to generate code from a graphical model. To generate code, environment 165 may parse the graphical model (step 192). Environment 165 may generate one or more intermediate representations (IRs) from the parsed model (step 194). An IR may be a control flow graph (CFG) that captures the semantics of the graphical model. An IR represented by a CFG may include nodes that represent algorithmic aspects of the graphical model and edges that indicate the flow of the algorithms. Subsequently, environment 165 generates code from the one or more IRs (step 196).

Generated code may be designed to run on substantially any type of device that can execute instructions. For example, generated code may be designed to run on a processor, microprocessor, dual-core processor, multi-core processor, cluster of processors, digital signal processor (DSP), system on chip (SOC), reconfigurable signal conditioning hardware, operating system, computational hardware device, component of a computational hardware device, etc. In one embodiment, generated code may include embedded code targeted to run on an embedded system. For example, generated code may be implemented as firmware in an electronic system that uses a microprocessor or a microcontroller. Additionally, generated code can be customized to run on a specific target hardware platform. For example, generated code may include fixed-point code to run a fixed-point processor or generated code may emulate fixed-point behavior on a floating-point processor.

Referring again to FIG. 1A, input control 120 may interface with a keyboard 140, a mouse 142, a microphone 144, a camera 146 (e.g., a web camera) and/or other input devices, such as, for example, motion-based input devices. Computing device 100 may receive through input control 120 input data, such as input data for developing a model and/or input data related to one or more data sets. Computing device 100 may display on display 135 user interfaces for displaying data generated by an application, such as environment 165.

Figure 2:
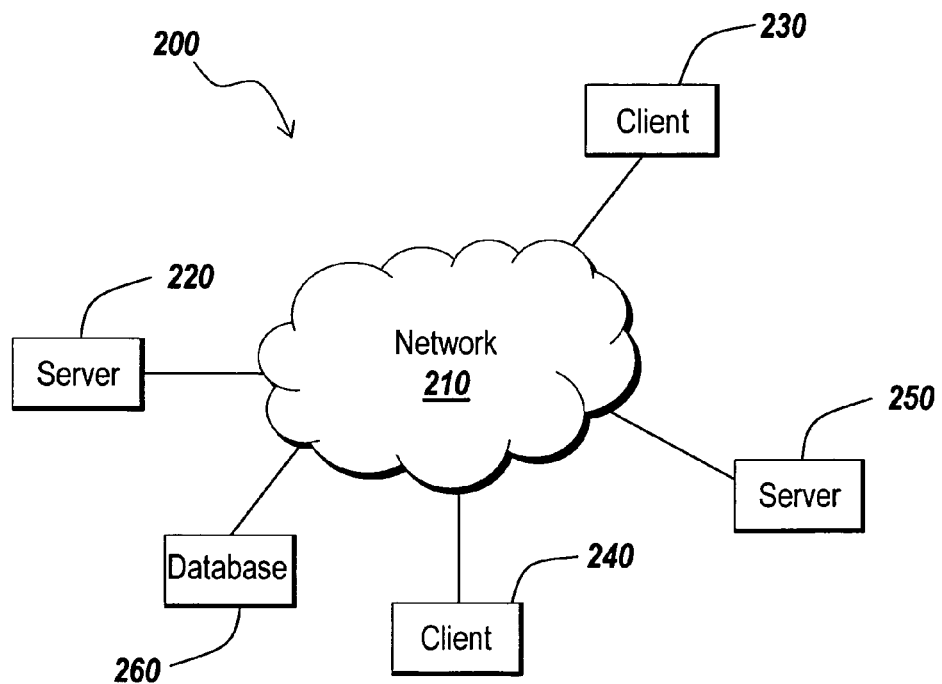
FIG. 2 depicts an exemplary distributed system suitable for practicing distributed implementations of exemplary embodiments.

FIG. 2 is an exemplary network environment 200 suitable for implementing distributed embodiments. Network environment 200 may include one or more servers 220 and 250 coupled to clients 230 and 240 via a communication network 210. In one implementation, servers 220/250, clients 230/240, and/or database 260 may be implemented via computing device 100 (FIG. 1A). Servers 220/250 and clients 230/240 may also be coupled to a database 260 via communication network 210. Database 260 may store data sets that may be accessed by servers 220/250 and/or clients 230/240. Network interface 130 and modem 125, of computing device 100, may enable servers 220/250 to communicate with clients 230/240 through communication network 210. Communication network 210 may include Internet, intranet, Local Area Network (LAN), Wide Area Network (WAN), Metropolitan Area Network (MAN), wireless network (e.g., using IEEE 802.11, IEEE 802.16, and/or Bluetooth), etc. Communication network 210 may use middleware, such as Common Object Request Broker Architecture (CORBA) or Distributed Component Object Model (DCOM) to allow a computer on communication network 210 to communicate directly with another computer or device that is connected to communication network 210. In addition, the communication network 210 may use Remote Method Invocation (RMI) or Remote Procedure Call (RPC) technology. RMI and RPI are exemplary technologies that allow functions, methods, procedures, etc., to be called over the environment 200. For example, the client 230 may invoke a method that resides remotely on the client 240.

In an exemplary implementation of network environment 200, servers 220/250 may provide clients 230/240 with software components and/or products under a particular condition, such as a license agreement. The software components and/or products may include software components and/or products for providing environment 165 (FIG. 1A). The software components and/or products may also include those for editing data in one or more data sets and/or for saving data sets. In one example, software components for environment 165 may represent components for developing, editing, debugging and/or simulating a model of a system, and/or for generating code from the model.

Client 240 may perform modeling tasks using a software component/program provided to client 240 by server 220. Client 240 may also send server 220 a model for simulation (e.g., server 220 may perform simulation tasks on behalf of client 240 as a managed service offered on a subscription basis or on another basis). Server 220 may return simulation results to client 240 and client 240 may display the data to a user. In another example, client 240 may edit data in a data set on behalf of a user, where the data and/or data set may reside locally on client 240 or may reside remotely with respect to client 240 on server 220 or database 260.

In another example, servers 220/250 and/or database 260 may act as repositories for data sets. Clients 230/240 may access the data sets stored on servers 220/250 and/or database 260. Clients 230/240 may load one or more data sets via environment 165. Clients 230/240 may edit data contained in a data set and may return the data set to servers 220/250 or database 260 for storage.

Figure 3A:
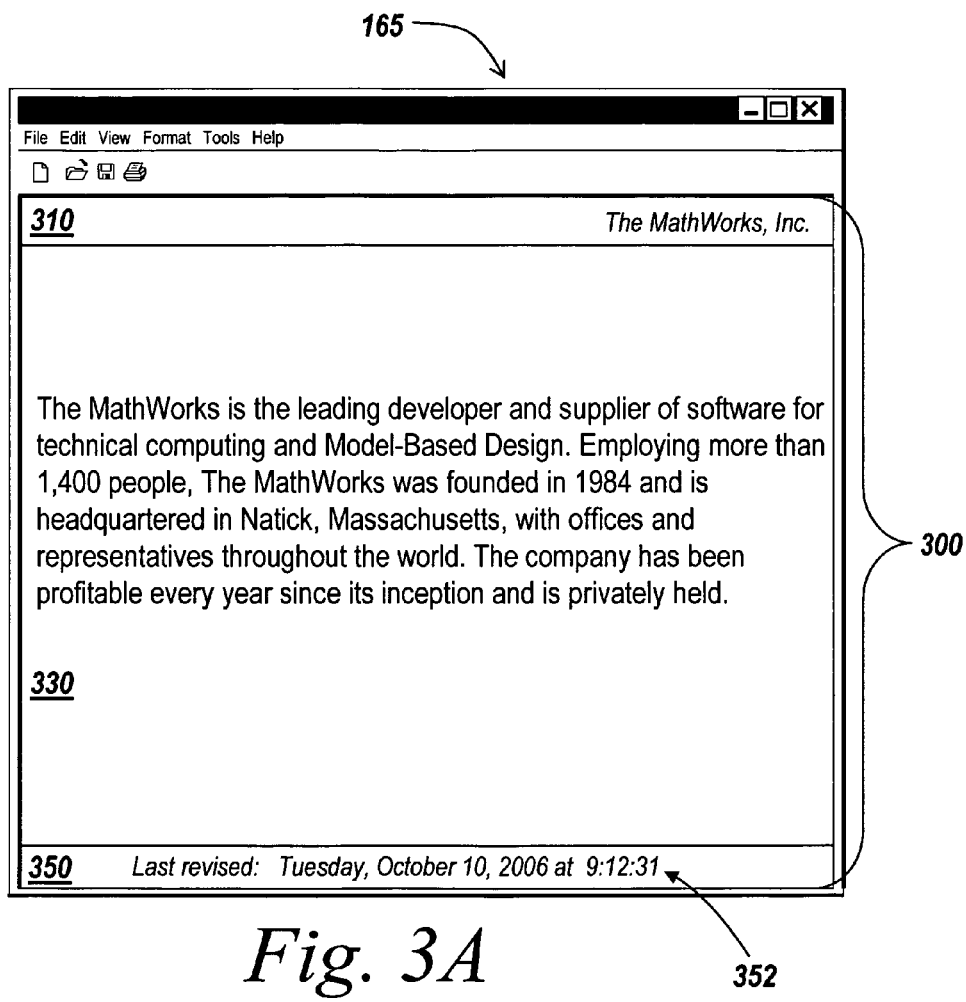
FIG. 3A depicts an exemplary document that may be opened in an exemplary computing environment.

FIG. 3A depicts an exemplary document 300 that may be opened within environment 165 (FIG. 1A), to create an in-memory version of a data set. In FIG. 3A, environment 165 may be a word processing environment. Document 300 may be stored as a file on computing device 100 or remotely using network environment 200. Document 300 may have a header 310, a body 330 and a footer 350. Environment 165 may provide a revision value that indicates when a most recent revision event has occurred. The revision value may include a date value, time value, a revision number and/or user name. In some instances, environment 165 may allow a user to insert a revision manifestation 352 into document 300 so that the revision value is displayed in document 300. The revision manifestation may be the revision value itself and/or may include other information that is related to the revision event. For example, footer 350 may include revision manifestation 352 to provide a visual representation of the revision value. In the implementation of FIG. 3A, the revision value may be visible in document 300 using revision manifestation 352. In contrast, the revision value may not be visible in document 300 in other implementations. In addition, in some instances, a revision event may be indicated audibly, with a dialog window, with a pop-up window, by a change in the color of the window, or using any other indicator that may identify the occurrence of a revision event to a user.

In another implementation, Environment 165 may have an application program interface (API) that allows environment 165 to distribute the revision value to one or more destinations, such as other data sets, devices, environments, etc. In one example, the revision value may be distributed to a version control application such that when a revision event occurs in document 300, document 300 is automatically checked-in by the version control application. In another example, the revision value may be distributed to data sets that reference or that incorporate document 300. For example, a revision event may occur, and a revision value that is associated with the revision event may be distributed to another data set. Distributing the revision value to other data sets and/or environments allows the other data sets and/or environments to react to a revision in document 300. Distributing revision values may provide users of the other data sets and/or environments with an indication that a revision event has occurred in document 300.

Environment 165 may monitor document 300 for changes. For example, environment 165 can check an in-memory version of document 300 for changes. In one implementation, environment 165 may use an older version of document 300 (hereinafter old document) to compare against a newer version of document 300 (hereinafter new document). The old document may be an in-memory version or a stored version of document 300. The old document may be updated each time a revision event occurs.

Based on the monitoring of document 300, environment 165 determines when a revision event has occurred. In one embodiment, a requirement may be defined. The defined requirement may need to be satisfied for a revision event to occur. In one implementation, the requirement may be related to a determined amount of change (hereinafter "change amount") with respect to document 300, where change amount refers to a threshold that is used to determine or identify when a revision event has occurred. The change amount may be supplied by environment 165 and/or may be specified by a user. In another implementation, the requirement may be a type of change (hereinafter "change type"), where the change type identifies characteristics related to a change (e.g., a text change, a numeric change, a style change, a parameter change, a change related to a write operation, etc.) that was made to document 300. Environment 165 may supply the change type before determining whether a revision event has occurred. Alternatively, the user may specify a change type that identifies when a revision event has occurred. When environment 165 determines that a revision event has occurred, environment 165 updates the revision value.

Figure 3B:
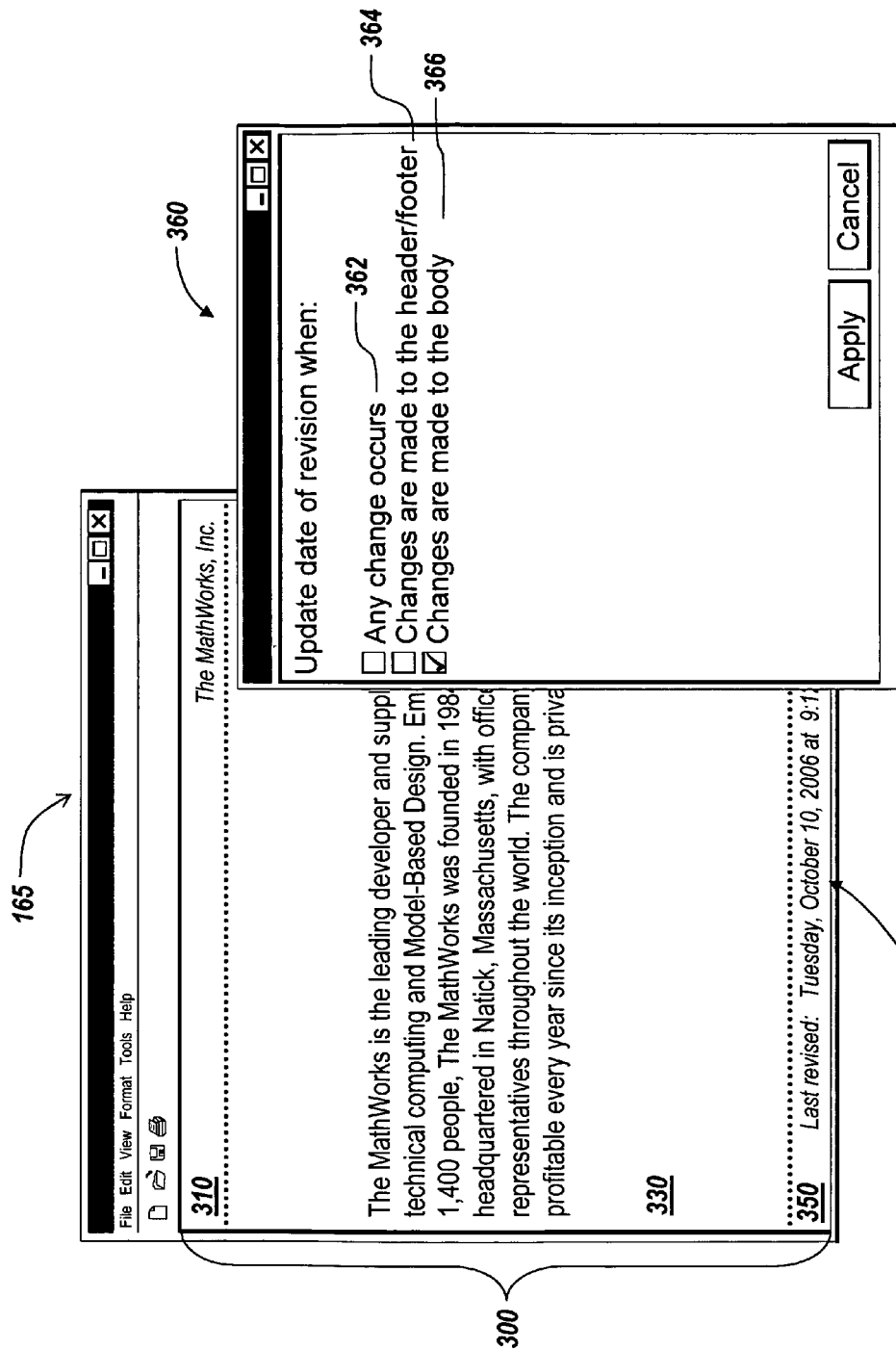
FIG. 3B depicts an exemplary menu that allows a user to specify a change type that can indicate when a revision event has occurred to the document of FIG. 3A.

FIG. 3B depicts environment 165 and an exemplary menu 360 that allows a user to specify a change type that can be used to determine when a revision event has occurred. Menu 360 includes an option 362, an option 364 and an option 366. Option 362 allows a user to specify that any change type results in a determination by environment 165 that a revision event has occurred. Option 364 allows the user to specify a change type such that the determination that a revision event has occurred is made when changes to header 310 or footer 350 are made. Option 366 allows the user to specify a change type such that the determination that a revision event has occurred is made when changes to body 330 are made. Menu 360 may be represented in many formats. For example, menu 360 may be a drop down menu, a pop-up window, etc.

Figure 3C:
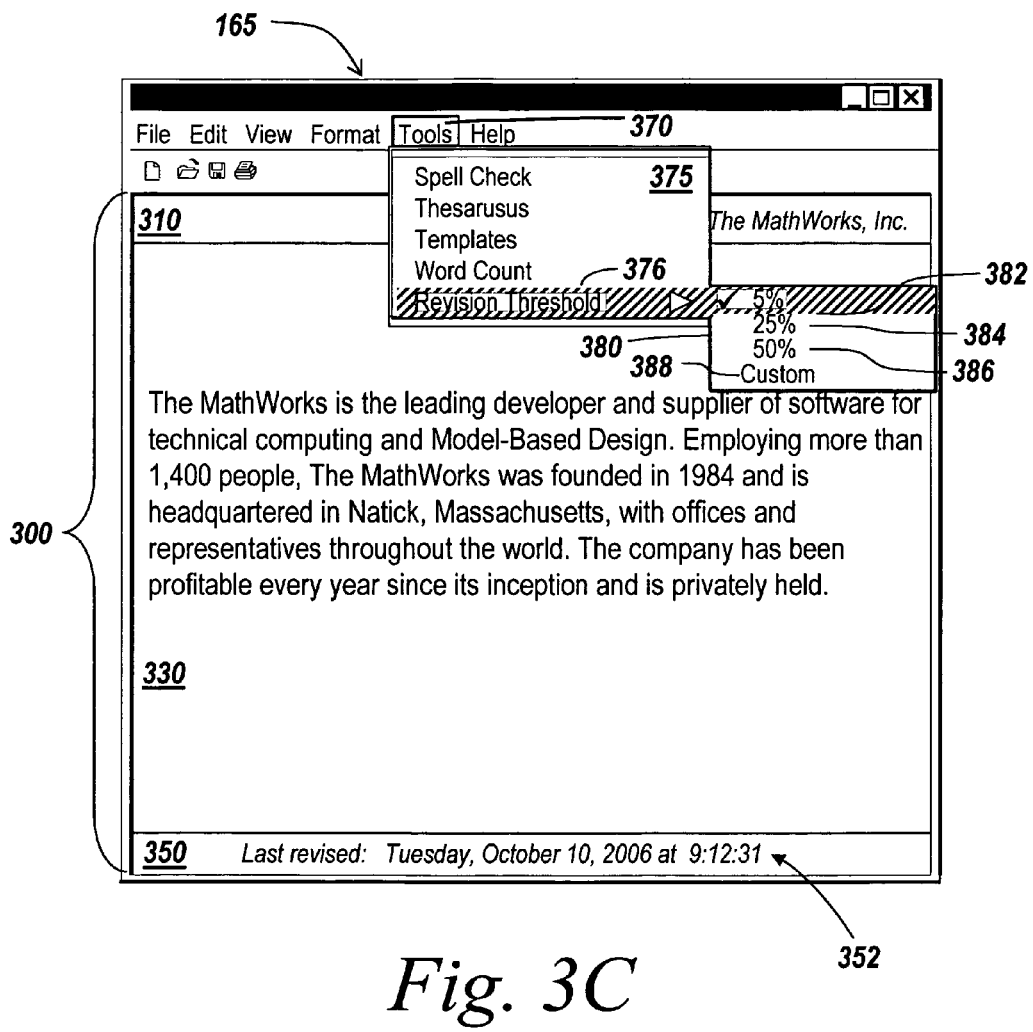
FIG. 3C depicts another exemplary menu that allows a user to specify an amount of change that can be used to determine when a revision event has occurred to the document of FIG. 3A.

FIG. 3C depicts an exemplary menu 375 and an exemplary submenu 380 that may be provided by environment 165 for specifying a change amount. Environment 165 may have a "Tools" button 370 that may be selected by a user. When "Tools" button 370 is selected, menu 375 may be provided. Menu 375 may include a menu item 376 that allows the user to bring up submenu 380. Submenu 380 allows the user to specify a change amount by selecting one of menu items 382, 384, 386 or 388. Menu item 382 allows the user to set the change amount to 5% of the data such that when more than 5% of the data in document 300 is changed, environment 165 determines a revision event has occurred. Menu item 384 allows the user to set the change amount to 25% of the data such that when more than 25% of the data in document 300 is changed, environment 165 determines a revision event has occurred. Menu item 386 allows the user to set the change amount to 50% of the data such that when more than 50% of the data in document 300 is changed, environment 165 determines a revision event has occurred. Menu item 388 allows the user to specify any change amount such that when document 300 is changed more than the specified amount, environment 165 determines a revision event has occurred.

Menus 360 and 380 are provided as examples of possible menus and are not meant to be limiting. Further, the various amounts and/or types of changes discussed above are exemplary and other configurable requirements may be specified before it is determined that a revision event has occurred. As one example, environment 165 may allow a user to specify a change amount and/or a change type together such that changes to a document must be of a certain change type and exceed a certain change amount before it is determined that a revision event has occurred. As another example, the change amount may be based on an absolute of change to data in a data set. For example, a change amount may be specified such that a revision event occurs in document 300 when more than five lines of text are added to or removed from document 300.

The revision value may be updated when environment 165 determines that a revision event has occurred. In one implementation, a flag may be set by environment 165 to indicate that a revision event has occurred. Based on the value of the flag, environment 165 may update the revision value. In other implementations of the revision value may be contained in an object. An "object," as used herein, refers to an instance of a data structure that is capable of performing operations and storing information, such as state information, variable information, constant data values, etc. For example, using the flag example, an execution method of the object may be invoked and may operate to update the revision value when the flag is set. Setting the flag may record the occurrence of the revision event. As used herein, "execution method" refers to code that performs an operation when the code is invoked (e.g., executed). Execution methods may compute values, update values, store values, return value, etc., based on one or more operations that are performed when an execution method is invoked. The revision value may provide a date and/or time that the revision event occurred. When the revision value is updated, revision manifestation 352 that provides a visual representation of the revision value may also be updated in document 300.

Figure 3D:
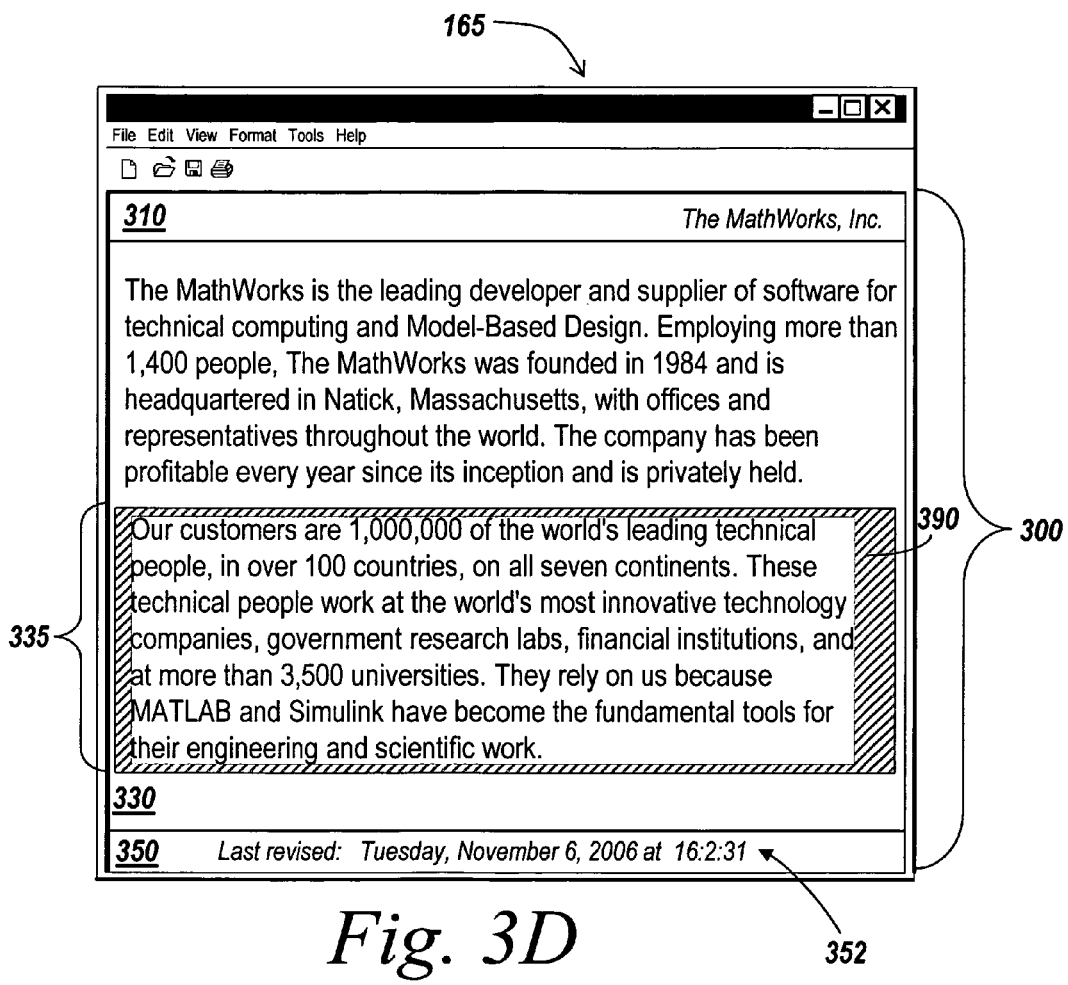
FIG. 3D depicts a document that is associated with an exemplary revision event.

FIG. 3D depicts document 300 after a change has occurred to body 330. In this example, the user has added a new paragraph 335 to body 330. Prior to the change, the user may have specified that a revision event occurs when body 330 is changed by selecting, for example, option 366 of menu 360 (FIG. 3B). The selection of option 366 specifies that environment 165 monitors document 300 for changes to body 330. In some instances, environment 165 may monitor body 330 when option 366 is selected and may not monitor body 330 when option 366 is not selected. In other instances, environment 165 may monitor some, all, or none of document 300 regardless of which option is selected. Based on the change to body 330, environment 165 determines that a revision event has occurred and updates the revision value to record the occurrence of the revision event. Environment 165 may also update revision manifestation 352 to reflect the occurrence of the revision event.

In addition to revision manifestation 352, environment 165 may display a graphical indication 390 to the user. Graphical indication 390 may identify portions of text document 300 that have been revised and/or may indicate information about the revision event, such as a size, magnitude, type, etc., of the revision event. Graphical indication 390 may vary depending on the information about the revision type. For example, environment 165 may implement a color scheme to identify a revision event based on a degree or amount of change. For example, minor changes may be represented by one graphical indication, while major changes may be represented by another graphical indication. In one implementation, graphical indication 390 may highlight portions of document 300 or may encompass portions of document 300 with a visual indicator, such as a border, icon, etc. Graphical indication 390 may be represented by different colors and may have a color coded scheme that relates to information about the revision event. For example, if the user modifies a single word in body 330, environment 165 may highlight the word with the color blue, which in this example corresponds to a minor revision event. Alternatively, the user may add a paragraph to body 330. In this case, environment 165 may highlight the paragraph in red indicating that the revision was a major revision event.

The examples depicted in FIGS. 3A-D represent environment 165 as an exemplary word processing environment, such as Microsoft Word® or a portable document format (PDF) editor; however, embodiments may be implemented in other document processing environments, such as, for example, an environment for developing spreadsheets, such as Microsoft Excel®; an environment for developing presentations, such as Microsoft PowerPoint®; markup language editors, such as hypertext markup language (HTML) editors or eXtensible Markup Language (XML); etc. Environment 165 may also be represented by other types of environments, such as textual and/or graphical editing environments (e.g., programming debugging environments), textual and/or graphical modeling environments, textual and/or graphical simulation environments, etc.

Figure 4A:
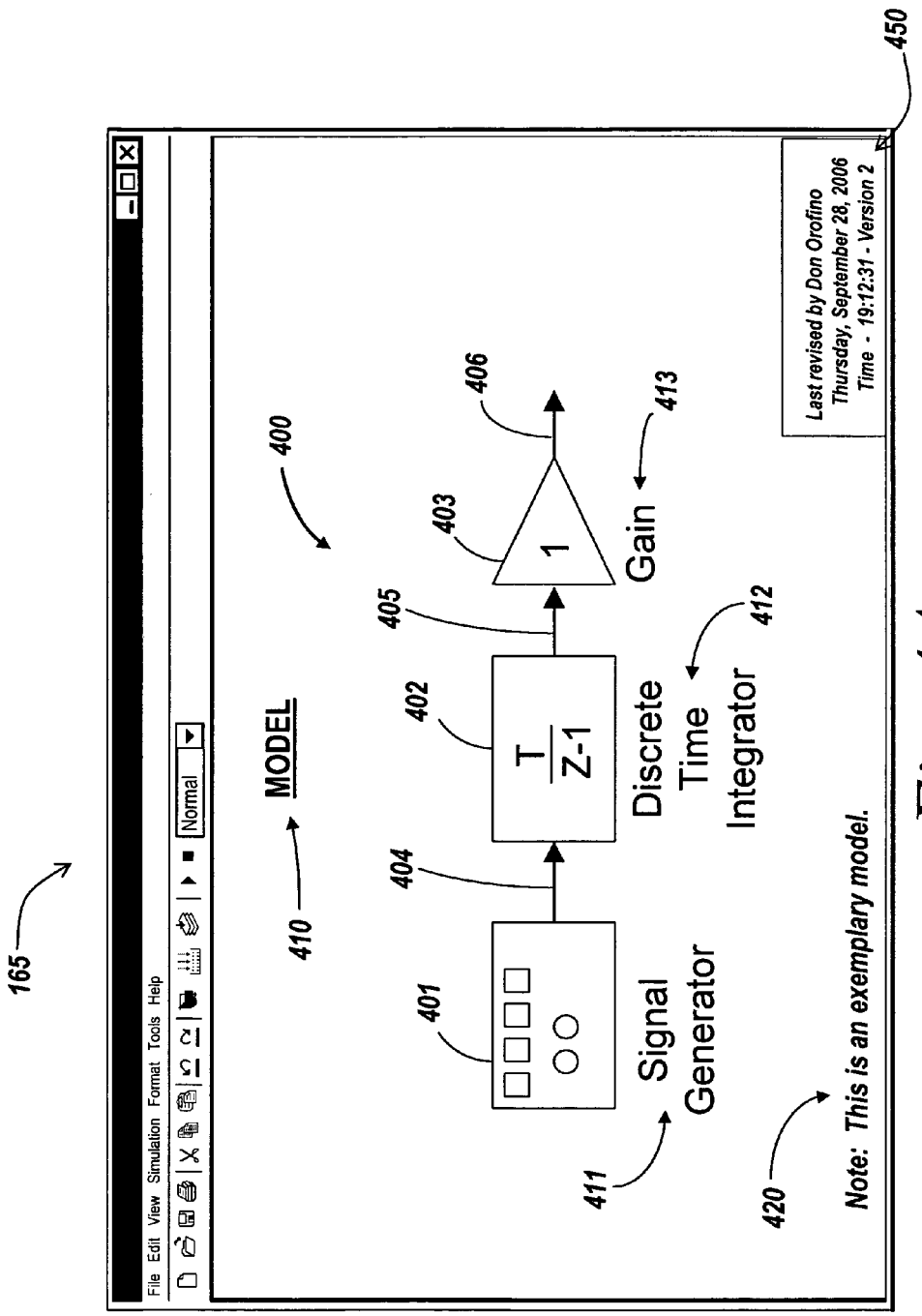
FIG. 4A depicts an exemplary model that may be developed using an exemplary computing environment.

FIG. 4A depicts an exemplary model 400 that may be developed using environment 165. In this example, environment 165 is a graphical modeling environment and model 400 is a graphical model. Model 400 may be stored as a file on computing device 100 (FIG. 1A) or remotely in network environment 200 (FIG. 2). A user may open model 400 in environment 165. Upon opening model 400 in environment 165, an in-memory version of model 400 may be created. Model 400 includes an element 401, an element 402, an element 403, a signal line 404, a signal line 405, signal line 406 and a revision manifestation 450. Model 400 may also include annotated text for elements 401-403. Annotated text may indicate the names for elements 401-403. For example, element 401 may have annotated text 411, element 402 may have annotated text 412 and element 403 may have annotated text 413. Model 400 may also include a title 410 as well as textual notes 420.

Elements 401-403 may represent, but are not limited to continuous and discrete dynamics elements, such as integration, unit delay, etc.; algorithmic elements, such as sum, product, lookup tables, etc.; and/or structural elements, such as multiplexers, switches, signal or bus selectors, etc; event based elements; state based elements; etc. Elements 401-403 may be used in model 400 to develop a model of a system, such as a dynamic system.

Elements 401-403 may interact with each other based on signal lines 404-406 in model 400. Signals may be passed to and from elements 401-403 in model 400 using signal lines 404-406. The signals may be represented by various data types, such as integer, floating point, double, unsigned or signed bytes or words, etc. The signals may be contained in a bus format, frame format, byte format, bit format, etc. Signals as used herein may be stored, retrieved from storage, may be passed from one block to another block, may be processed by one or more blocks using referencing mechanisms, such as pointers, without actually passing the signal from one block to another block, etc. Frames as referred to herein are a temporal collection of data samples. For example, a frame may include a fixed number of data samples that are transmitted as a unit from one element to another element in a model. The samples in a frame may, for example, represent a serial stream of data that is transmitted during a specified time period. For example, a user or system may determine a time interval for a stream of data that is assembled into one or more frames. In one implementation, when an assembled frame is transmitted, all samples in the frame may be sent at substantially the same time. In another implementation, all samples in the frame may not be transmitted at substantially the same time.

Revision manifestation 450 may be inserted into model 400. Revision manifestation 450 provides a visual representation of the revision value that indicates a revision event has occurred. Revision manifestation 450 may include a date and/or time value that indicates when the last revision event occurred. Revision manifestation 450 may be implemented so as to update automatically when a revision event occurs, thereby indicating to the user that the revision event has occurred. In some instances, a revision event may be indicated audibly, with a dialog window, with a pop-up window, by a change in the color of the window, or using any other indicator that may identify the occurrence of a revision event to a user. In another implementation, revision manifestation 450 may be implemented so as to be updated manually, such as via a user input.

Environment 165 monitors model 400 for changes. In one implementation, environment 165 may monitor model 400 for changes by comparing a more recent version of model 400 (hereinafter new model) to an older version of model 400 (hereinafter old model). The old model may be an in-memory version or a stored version of model 400. The old model 400 may update each time a revision event occurs.

Based on the monitoring of model 400, environment 165 determines when a revision event has occurred. In one embodiment, a requirement that may or must be satisfied before it can be determined that a revision event has occurred may be specified. In another implementation, a necessary amount of change (hereinafter change amount) may be specified. In another implementation, a change type may be required and/or specified before it can be determined that a revision event has occurred. The requirement may be supplied by environment 165 or may be specified by a user, for example, by using a menu.

Figure 4B:
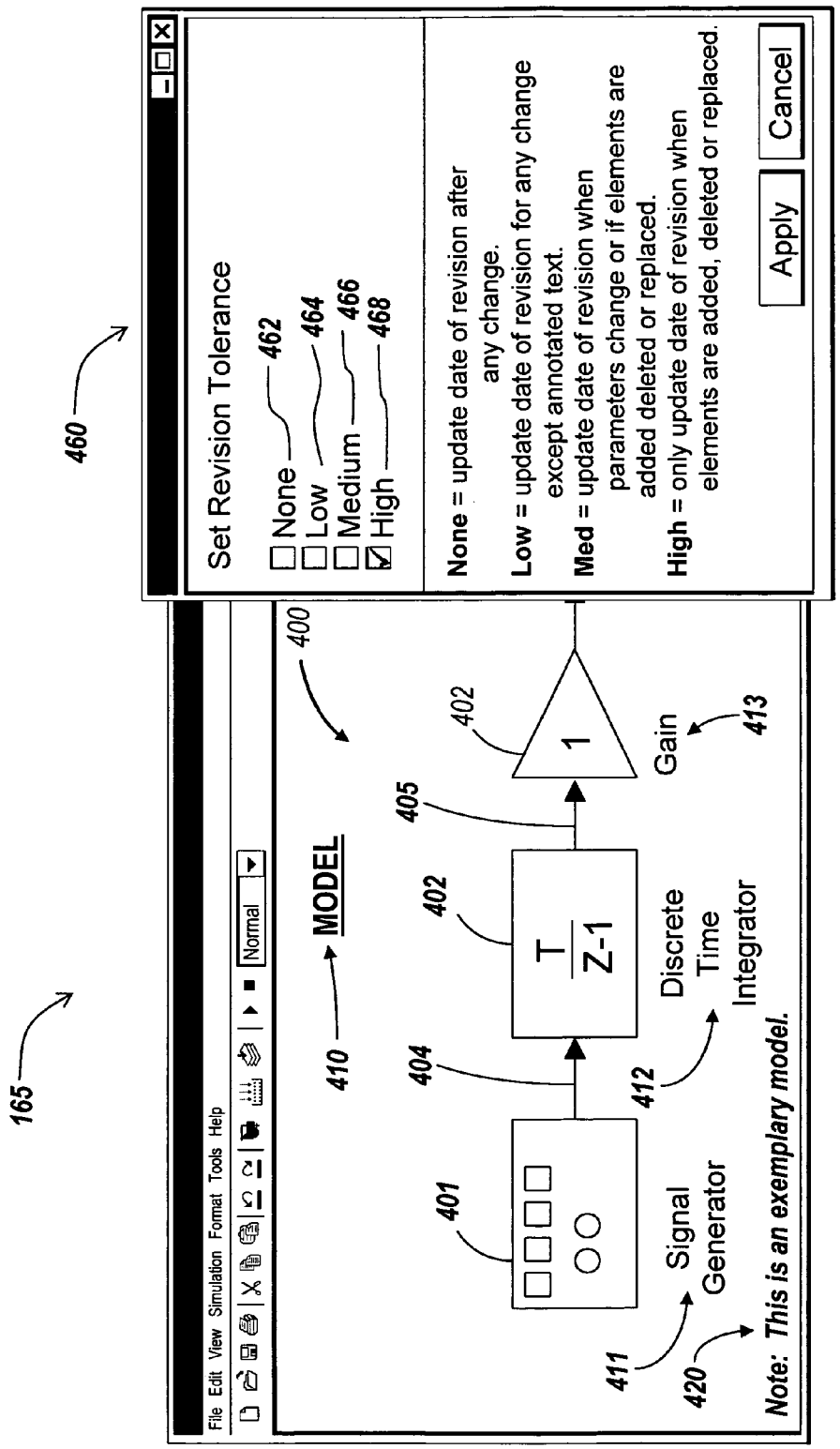
FIG. 4B depicts an exemplary menu that allows a user to specify a change type that can indicate when a revision event has occurred to the model of FIG. 4A.

FIG. 4B depicts environment 165 and an exemplary menu 460 that allows a user to specify a change type that may be required before determining that a revision event has occurred. Menu 460 includes an option 462, an option 464, an option 466 and an option 468. Option 462 allows a user to specify a change type such that any change made to model 400 results in a determination by environment 165 that a revision event has occurred. Option 464 allows a user to specify a change type such that any change made to model 400, except changes to annotated text, results in a determination by environment 165 that a revision event has occurred. Option 466 allows the user to specify a change type such that when parameters change or when an element is added, deleted, replaced, etc., a determination that a revision event has occurred is made by environment 165. Option 468 allows the user to specify a change type such that when an element is added, deleted or replaced, a determination that a revision event has occurred is made by environment 165.

Figure 4C:
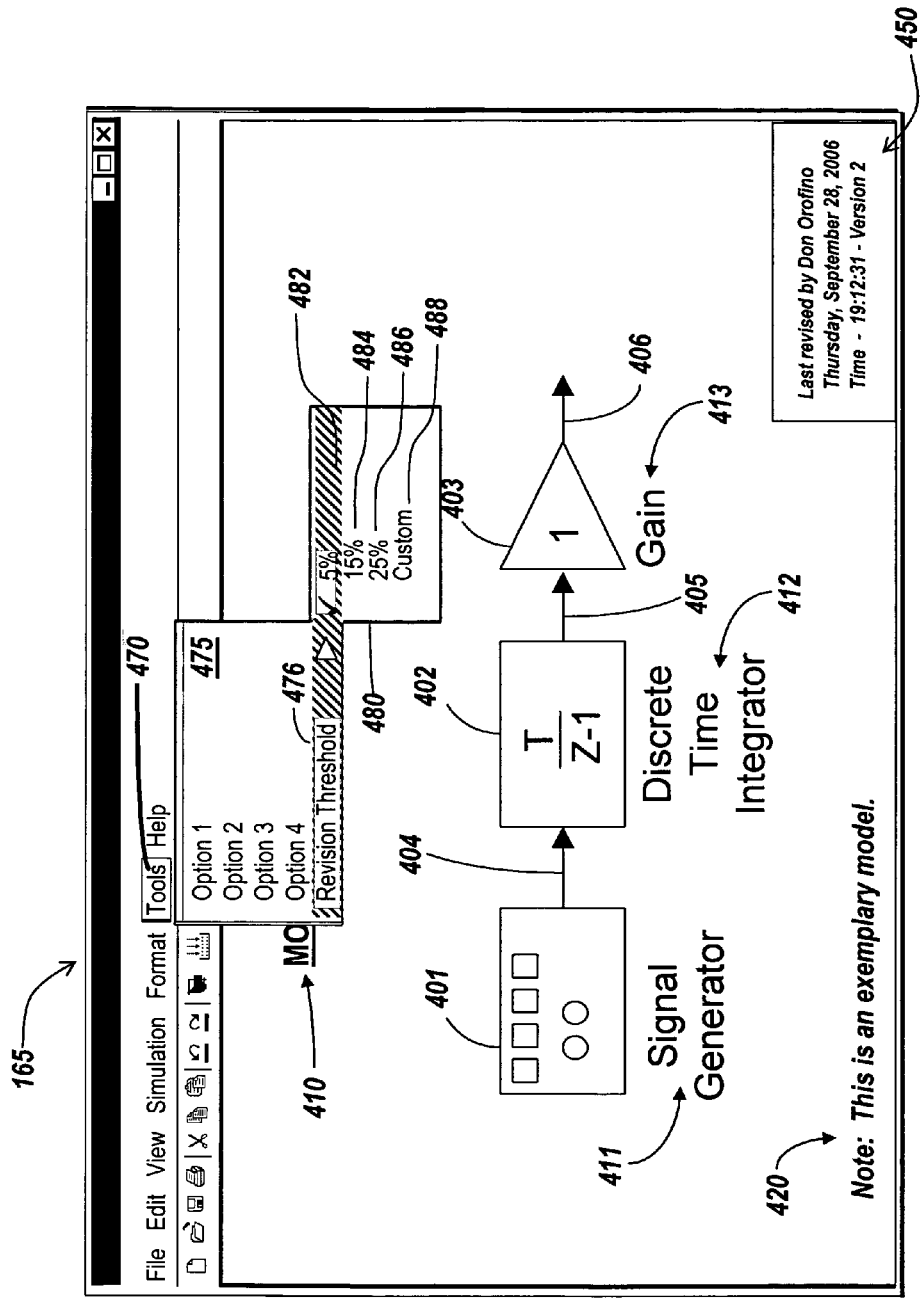
FIG. 4C depicts another exemplary menu that allows a user to specify a change amount that can be used to determine when a revision event has occurred to the model of FIG. 4A.

FIG. 4C depicts an exemplary menu 475 and an exemplary submenu 480 that may be provided by environment 165 for specifying a change amount. Environment 165 may have a "Tools" button 470 that may be selected by a user. When the "Tools" button 470 is selected, menu 475 may be provided to the user via display 135. Menu 475 may include a menu item 476 that allows the user to bring up submenu 480. Submenu 480 allows the user to specify a change amount required to cause environment 165 to determine that a revision event has occurred. For example, a user may select one of menu items 482, 484, 486 or 488 to use when determining whether a revision event has occurred. Menu item 482 allows the user to set the change amount to determined values, such as to 5% of the data such that when more than 5% of the data in model 400 is changed, environment 165 determines a revision event has occurred. Menu item 484 allows the user to set the change amount to 25% of the data such that when more than 25% of the data in model 400 is changed, environment 165 determines a revision event has occurred. Menu item 486 allows the user to set the change amount to 50% of the data such that when more than 50% of the data in model 400 is changed, environment 165 determines a revision event has occurred. Menu item 488 allows the user to specify a custom change amount that can be used to identify when a revision event has occurred such that when model 400 is changed by more than the specified custom change amount, environment 165 determines a revision event has occurred.

Menus 460 and 480 are provided as examples of possible menus and are not meant to be limiting. Further, the requirements discussed above, with respect to FIG. 4B-C, are exemplary and other requirements may be specified before it can be determined that a revision event has occurred.

In one example, environment 165 may allow a user to specify a change type such that changes to a document must be of a certain change type and/or exceed a certain change amount before it is determined that a revision event has occurred.

Other implementations in addition to, or in alternative to the menus 360, 380, 460 and 480 in FIGS. 3B-C and 4B-C may be provided by environment 165. In one example, environment 165 may provide a dialog to the user that establishes requirements for a revision event. The requirements may be modified via graphical affordances in the dialog; for example a checkbox may be provided that determines whether a change in graphical size of blocks in the block diagram is to be considered a meaningful change to the model. A popup dialog may be presented that determines whether a change to font sizes, font styles, or both font sizes and font styles should trigger a revision event.

When environment 165 determines that a revision event has occurred, environment 165 updates the revision value that indicates when a revision event has occurred. To update the revision value, a flag may be set by environment 165 indicating that a revision event has occurred. Based on the value of the flag, environment 165 may update the revision value to record the occurrence of the revision event. The revision value may be contained in an object such that when the flag is set, an execution method of the object is invoked and operates to update the revision value. When the revision value is updated, revision manifestation 450 that corresponds to the revision value may also be updated in model 400.

In some instances, environment 165 may distribute the revision value to, for example, a version control application using the API such that when a revision event occurs in model 400, model 400 is automatically checked-in by the version control application. In some other instances, the revision value may be distributed to data sets that reference or incorporate model 400 such that when a revision event occurs, the revision value is distributed to another data set. Distributing the revision value to other data sets and/or environments allows the other data sets and/or environments to react to a revision in model 400 and may provide users of the other data sets and/or environments with an indication that a revision event has occurred in model 400.

The examples depicted in FIGS. 4A-C represent environment 165 as an exemplary graphical modeling environment, such as Simulink® software, however, exemplary embodiments may also be implemented in an environment for developing textual models such as an environment that uses MATLAB® software. Other modeling environments, in addition to MATLAB-based and/or Simulink®-based environments, that may be suitable for implementing exemplary embodiments may include, but are not limited to, software products such as the Stateflow® environment, LabVIEW®, MATRIXx, Mathematica®, Maple™, Dymola, Extend, Scilab™, Scicos, SCADE™, among others. Furthermore, one ordinarily skilled in the art will appreciate that exemplary embodiments may apply to other graphical or text-based modeling environments, such as a Unified Modeling Language (UML) modeling environment, a SysML modeling environment, or environments for modeling of physics domains.

Revision manifestation 450 provides a visual indication of the revision value that indicates when a revision event has occurred to model 400, as depicted in FIGS. 4A-C. In addition, portions of model 400 may also have a corresponding revision value. The portions that have a corresponding revision value may be monitored independently. For example, each element 401-403 may have a corresponding revision value. In addition other portions of a model may have corresponding revision values. For example, annotated text 412, annotated text 413, title 410, and/or textual notes 420 can have a corresponding revision value. Further, model attributes may have corresponding revision values. For example, model attributes, such as a window size, a window position, a number of windows, etc., may have a revision value that may provide the user or another application with an indication that a revision event has occurred. In one implementation, the window size, window position, and/or the number of windows may have a revision value that can be represented by a revision manifestation in the model 400.

In addition, when environment 165 enables code generation, as discussed herein with respect to FIGS. 1A-B, a user may specify code generation options. Code generation options may include, for example, an option for specifying a programming language to be used for code generation, optimizations that may be implemented during code generation, etc. These code generation options may each have a corresponding revision value. Depending on the requirements to be satisfied before a change qualifies as a revision event, changes to these code generation options may result in a revision event. In one example, when environment 165, which may be a graphical modeling environment that enables code generation, a code generation option may be provided that influences a number of spaces in the margin of the generated code. Changes to that option might not be considered a revision event by a user. In another example, a code generation option may be provided that influences the naming convention used on variables in generated code. Changes to that option may be deemed a revision event by a user. The graphical block diagram system may provide options to specify whether the change in margins, or the change in variable names, should qualify as a revision event. The options to specify may be provided in any form, such as in menus 360, 380, 460 and/or 480. In one or more exemplary embodiments, the revision event may occur independent of whether code is generated for the model. In one or more other exemplary embodiments, the revision may only occur after code is generated for the model.

Environment 165 may monitor each portion of the model (e.g., element 401-403, annotated text 412, annotated text 413, title 410, and/or textual notes 420, etc.) collectively or independently from each other as well as collectively or independently from the monitoring of model 400. Based on the monitoring, environment 165 may determine whether, for example, a revision event has occurred in element 401 collectively or independently from a determination that a revision event has occurred in elements 402-403 or in model 400.

In some instances, changes to a portion of the model that relates to a subsystem, referenced subsystem or referenced model can result in an occurrence of a revision event. A subsystem or referenced model allows a user to provide layers of models within the model to facilitate containment, separation and/or nesting for a part of the model. A subsystem may accept inputs from other elements in the model and may provide outputs to be used by the model. A subsystem may be a reference to a library element. A referenced subsystem refers to a subsystem that is not explicitly included in the model, but is rather referenced in the model such that when environment 165 executes the referenced subsystem, environment 165 is directed to a location where the referenced subsystem is. A referenced model refers to a model that is referenced by the model such that when environment 165 executes the model it may be directed to a location of the referenced model to execute the referenced model. The revision event may result in a revision value for the model to be updated or may result in a revision value that corresponds to the portion to be updated.

In some instances, a revision event generated by a referenced model or referenced subsystem may indirectly cause a revision event in the referring model that includes a reference to the referenced model or referenced subsystem. For example, a user may modify a referenced model or referenced subsystem where the modification qualifies as a revision event and the model that incorporates the referenced model or referenced subsystem may determine that revision event has occurred based on the revision event in the referenced model or referenced subsystem. A revision event in the referring model may be directly generated based on a change in the referenced model or referenced subsystem such that modification in the referenced model or referenced subsystem are determined to qualify as a revision event in the model. In addition, a revision event in the referenced model or referenced subsystem may be generated based on a revision in the referring model.

In one implementation, elements 401-403 (FIGS. 4A-C) may have parameters for which parameter values may be set. The parameters may affect the functionality and operation of elements 401-403 for simulation and/or code generation or may be directed to non-functional aspects, such as a name, appearance, color, etc., of elements 401-403. For example, element 401 may have a parameter directed to a type (e.g., integer, floating point, etc.) of a signal value that is generated during a simulation. A user may change a parameter value that corresponds to the parameters of element 401, and, based on that change, environment 165 may determine that a revision event has occurred with respect to element 401. When it is determined that a revision event has occurred, the revision value that indicates a revision event has occurred to element 401 is updated to record the occurrence of the revision event. Environment 165 may provide a revision manifestation as a visible representation of the revision value as part of a window that displays the parameters. To view the window, the user may select element 404 using a pointing device (e.g., by right clicking a mouse button) to bring up a menu of options that includes an option for viewing a revision manifestation of the revision value.

Figure 5A:
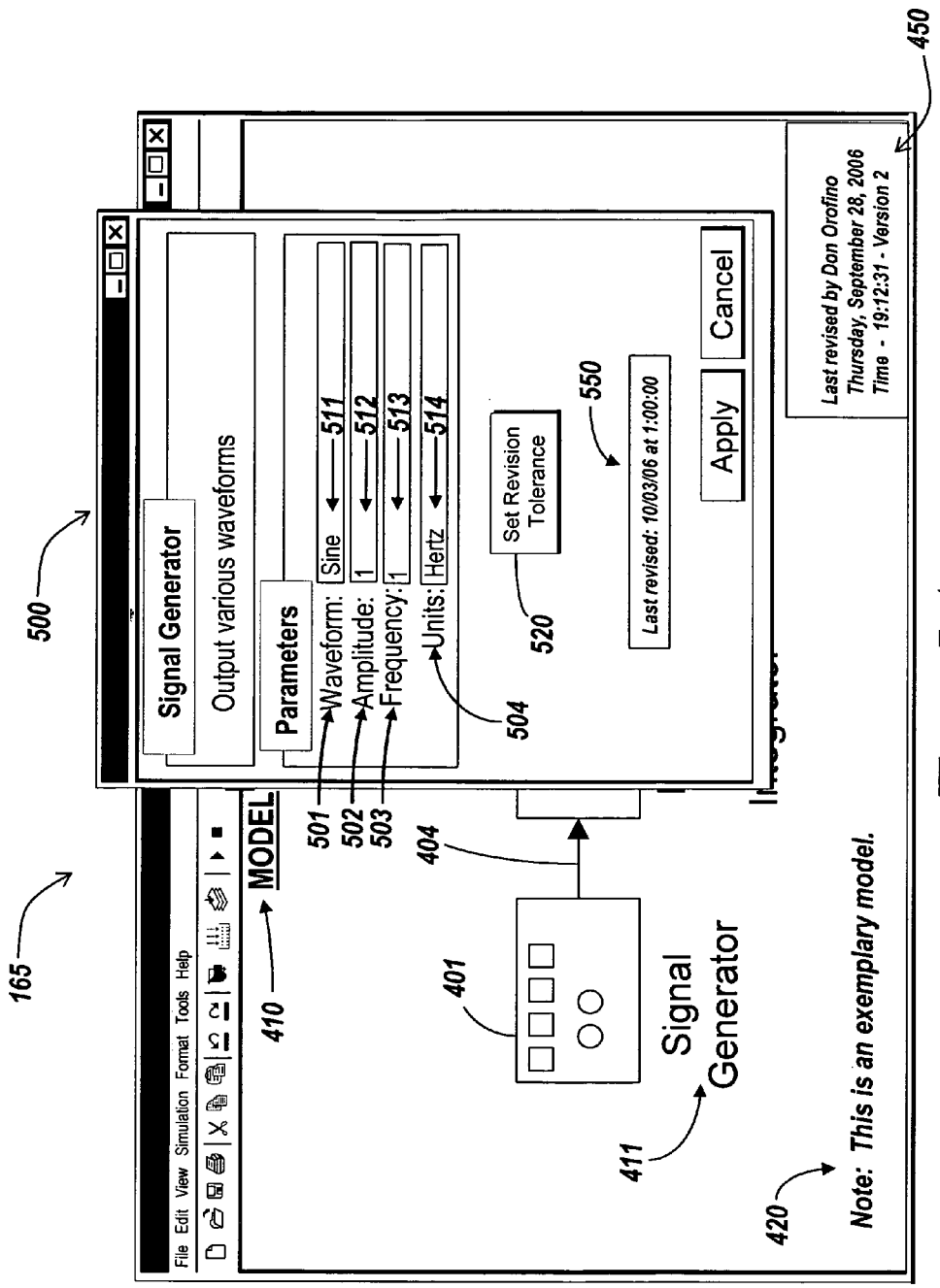
FIG. 5A depicts an exemplary parameters window that allows a user to view and/or edit parameters that are associated with elements in a model.

FIG. 5A depicts a parameters window 500 that allows a user to view and/or edit parameters that are associated with element 401 (FIG. 4). To display parameter window 500, the user may select element 401 with a pointing device. Parameter window 500 includes parameters 501-504 and revision values 511-514 that correspond to parameters 501-504. The user may edit revision values 511-514 to change the functionality of element 501 during simulation.

Parameter window 500 may also include a revision manifestation 550 that corresponds to a revision value for element 401. Each element 401-403 may have its own revision value such that each element 401-403 may have a different revision value depending on edits made to respective ones of elements 401-403. In one implementation, a requirement may be set, where the requirement must be satisfied for a revision event to occur for elements 401-403. The requirement may be a change type or change amount, which may be implemented in a manner similar to techniques discussed with respect to FIGS. 4A-C, with regard to menus 460 and 480. For example, the parameter window 500 may have a set revision tolerance button 520 that may bring up a menu that is similar to menu 460 or 480. For example, the menu may have options for specifying change types or a change amount that must occur before environment 165 can determine a revision event has occurred to element 401. Alternatively, elements 401-403 may have the same revision tolerance setting as model 400.

Using menu 460, a user may specify a change type that is required before determining that a revision event has occurred to model 400 by selecting option 468. The user may also set an independent change type required before it is determined that a revision event has occurred to element 401. For example, using a menu similar to menu 460 the user may specify that any change to element 401 constitutes a revision event. Environment 165 can monitor model 400 and element 401 independently and may determine that a revision event has occurred to model 400 or element 401 when a change is detected with respect to element 401. Environment 165 may update the revision values for model 400 and element 401 independently based on the determination. For example, a user may change parameter 501 in element 401, which may result in a revision event based on the revision tolerance set by the user for element 401. A change in parameter 501, however, may not be considered a change type for which model 400 is being monitored because the user specified the change in parameter 501. For example, the user may have specified that adding, deleting, or replacing an element (e.g., option 468) in model 400 results in the determination that a revision event has occurred for model 400. Therefore, environment 165 does not update the revision value that indicates a revision event has occurred for model 400.

Figure 5B:
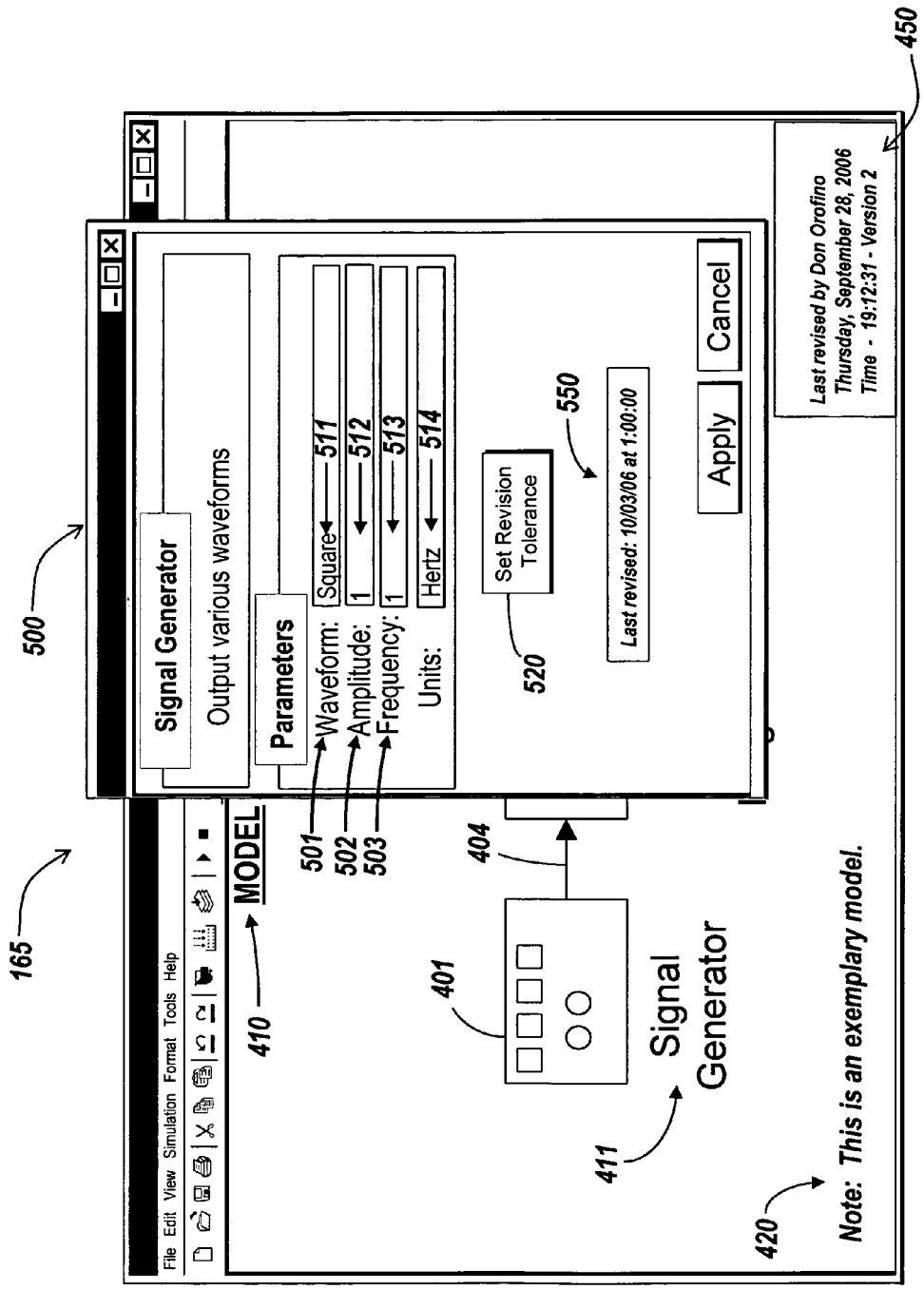
FIG. 5B depicts the exemplary parameter window of FIG. 5A after a parameter value has changed.

FIG. 5B depicts a change to a parameter value 511 that corresponds to parameter 501 of element 401. After the change, the revision value that indicates a revision event has occurred to element 401 is updated, and, consequently, revision manifestation 550 is updated to reflect that a revision event has occurred to element 401. However, the revision value to model 400 is not updated, and consequently, revision manifestation 450 is not updated.

Figure 5C:
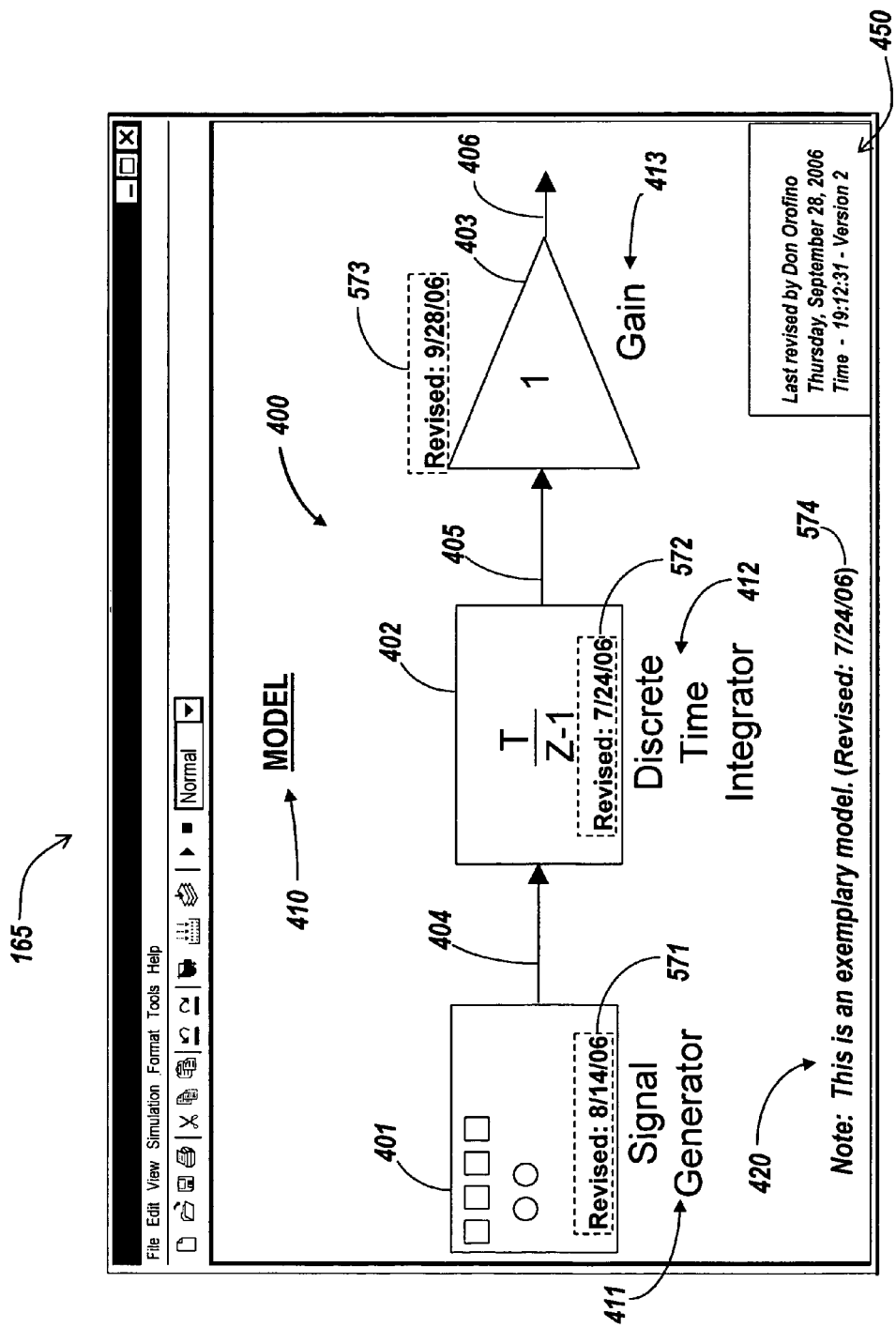
FIG. 5C depicts exemplary revision manifestations that correspond to portions of the exemplary model of FIG. 4A.

In another implementation, environment 165 may display revision manifestations that correspond to given portions of a model on or about the corresponding portion of the model. FIG. 5C depicts revision manifestations 571-574 as well as revision manifestation 450. Revision manifestation 571 corresponds to element 401. Revision manifestation 572 corresponds to element 402. Revision manifestation 573 corresponds to element 403. Revision manifestation 574 corresponds to textual note 420.

Figure 6:
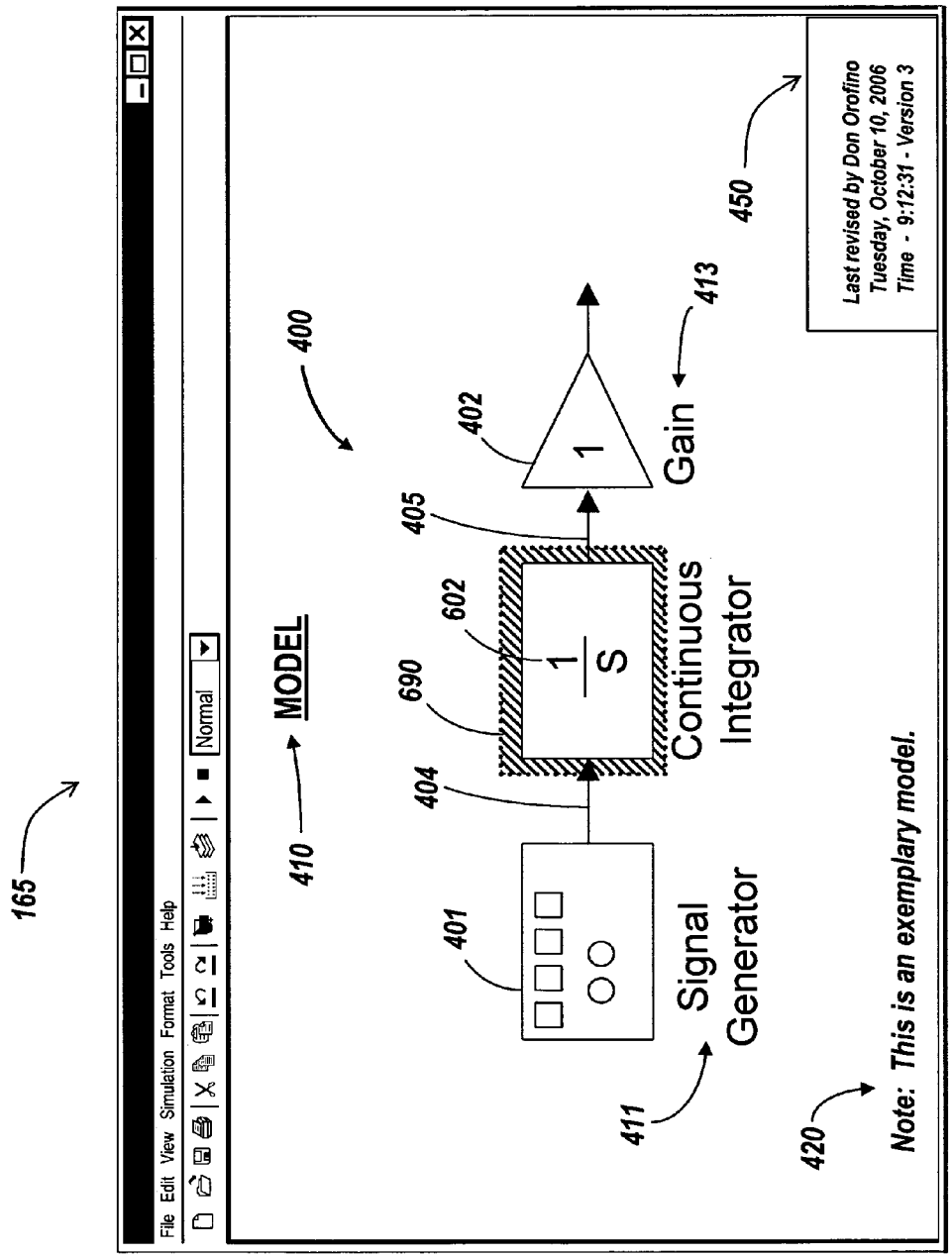
FIG. 6 depicts a model after a change type has occurred, where the change type can constitute an exemplary revision event.

The user may further edit model 400 by replacing element 402 with element 602, as depicted in FIG. 6. After the change, the revision value for model 400 is updated to record the occurrence of the revision event, and consequently, revision manifestation 450 is updated. The revision value for element 401, however, is not updated, and consequently, revision manifestation 550 for element 401 is not updated.

As depicted in FIGS. 5-6, environment 165 may independently specify portions of a model that are monitored. Each portion may have a corresponding revision value. Environment 165 may independently monitor the portions to determine whether a revision event has occurred in the portions.

Still referring to FIG. 6, in addition to revision manifestation 450, environment 165 may display a graphical indication 690 to the user. Graphical indication 690 may identify portions of model 400 that have been revised and/or may identify a magnitude of the revision event (e.g., a magnitude of change associated with a revision event). In this example, graphical indication 690 indicates that element 602 has replaced element 402 in model 400. Graphical indication 690 may highlight portions of model 400 or may encompass portions of model 400 with a border. Graphical indication 690 may be represented by different colors and may have a color coded scheme that relates to the magnitude of revisions event. For example, when the user modifies a parameter (e.g., parameter 501) of an element (e.g., element 401) in model 400, environment 165 may highlight the element (e.g., element 401) with the color blue to indicate a minor revision event has occurred with respect to the element (e.g., element 401). Alternatively, when the user replaces element 502 with element 602 in model 400, environment 165 may highlight element 602 in red indicating that the revision to model 400 was a major revision event.

Figure 7:
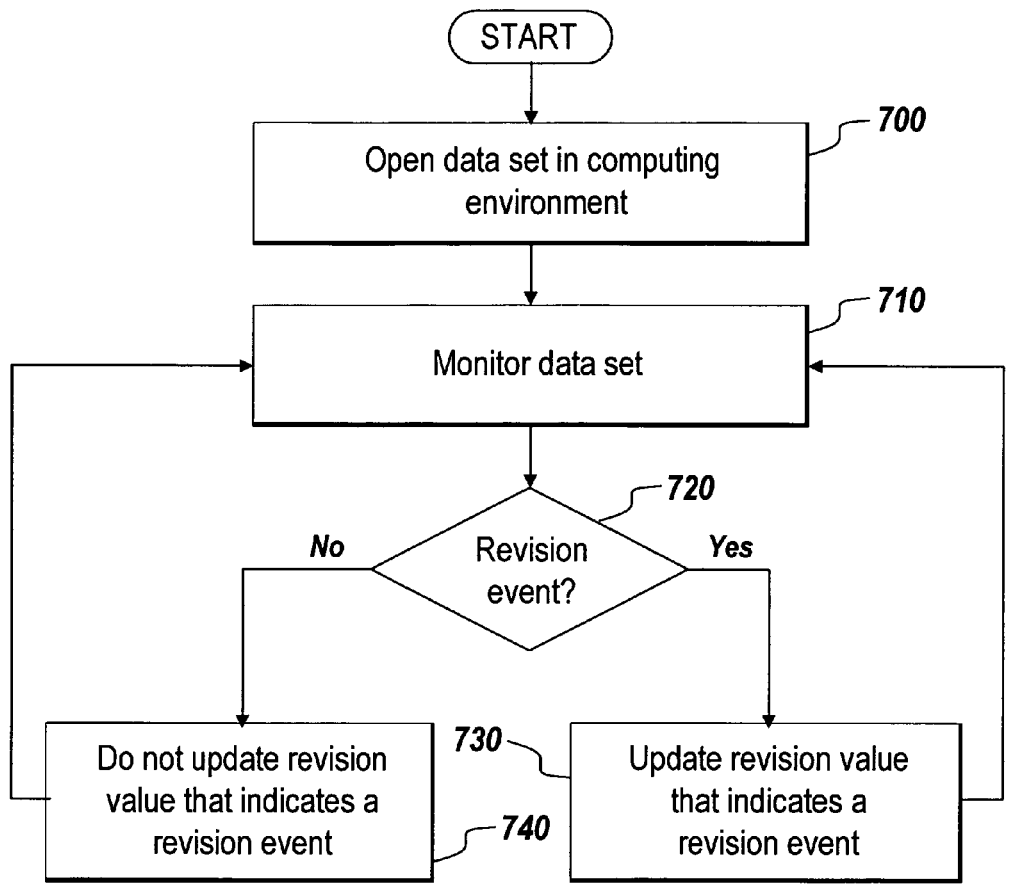
FIG. 7 is a flow diagram that illustrates exemplary processing for providing a value that indicates when a revision event has occurred.

FIG. 7 is a flow diagram that illustrates exemplary steps for providing a revision value that indicates when a revision event has occurred in an exemplary embodiment. A data set (e.g., document 300, model 400, etc.) may be stored on computing device 100 (FIG. 1A) or may be stored in a remote location on network environment 200 (FIG. 2). In this manner, the data set may be a serialization artifact, such as a file. The data set may represent a text document, a spreadsheet document, a PDF, an HTML document, an eXtensible Markup Language (XML) document, a textual model, a graphical model, etc. A user may open the data set in environment 165 (step 700). When the data set is opened an in-memory-version of the data set may be created.

Environment 165 monitors the data in the data set to determine when a revision event occurs (step 710). Environment 165 may monitor one or more portions of the data set or may monitor the entire data set. Environment 165 may track changes made to the data set when monitoring data in the data set. Environment 165 may continuously or periodically check an in-memory version of the data set for changes. Environment 165 may use a previous version of the data set as a reference to compare with the current data set. The reference data set may be an in-memory version of the data set that is updated when a revision event occurs. Alternatively, environment 165 may compare a current in-memory version of the data set with a stored version of the data set. In some instances, environment 165 may store the current data set and may compare the stored current data set to a reference data set that may be represented by an in-memory version or that may be stored as well.

If environment 165 determines that the data in the data set has been revised (step 720), a revision value that indicates when a revision event occurred is updated by environment 165 to record the occurrence of the revision event (step 730). In some instances, the revision value may not be updated until the data set is saved using environment 165. Subsequently, environment 165 may continue to monitor the data set for another revision (step 710). In some instances, environment 165 may stop monitoring the data set after it is determined that a revision event has occurred. The revision value may be represented by a date, time, user name, revision number or any other revision value that indicates when the revision event occurred and/or by whom it was made. If, however, environment 165 determines that the data in the data set has not been revised (step 720), environment 165 does not update the revision value (step 740). Environment 165 may then continue to monitor the data set for a revision event (step 710). When determining whether a revision event has occurred, environment 165 may supply or the user may specify a requirement that must be satisfied before environment 165 can determined that a revision event has occurred. For example, the user may select options 362-366 with respect to FIGS. 3B-C or options 462-468 with respect to FIGS. 4B-C.

Each time environment 165 determines a revision event has occurred to a data set they may store information related to the revision event. The information may be stored in the form of a log. In one implementation, the log may be stored as a file.

Figure 8:
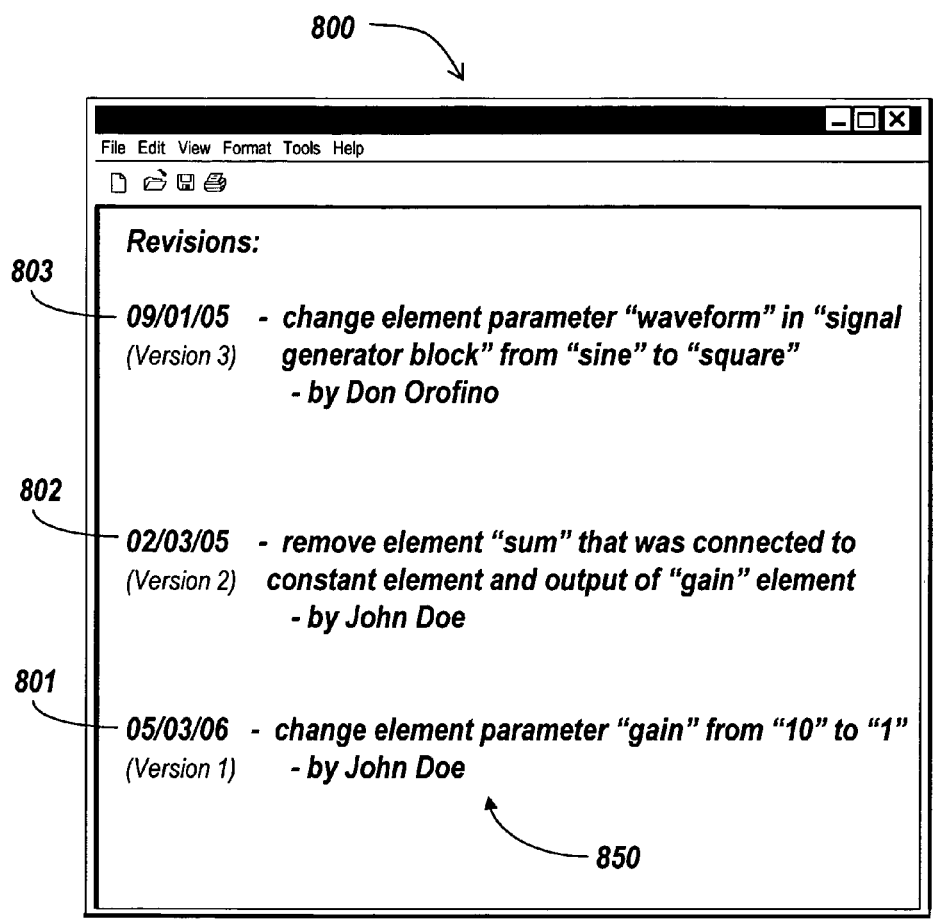
FIG. 8 depicts an exemplary log file that may be created by an exemplary computing environment.

FIG. 8 depicts an exemplary log file 800 that may be created by environment 165. Environment 165 may implement an operation that is activated when a revision event occurs to create log file 800. The operation may read the revision value from an object that stores the revision value and may write the revision value to log file 800. The changes that constitute a revision event may be documented in log file 800. For example, the location, change type, change amount, name of a parameter, signal, element, etc., that resulted in a revision event may be inserted into log file 800 to associate the changes that constitute the revision event with the revision value.

Log file 800 includes information 850 regarding a revision event of a data set. Information 850 may include revision manifestations 801-803 that correspond to revision values. In this example, each of revision manifestations 801-803 are represented by a date and time. Information 850 may also include information that informs the user of changes that were made to data in the data set and/or the name of the user who made the changes. Log file 800 may be in a binary format, a clear-text format, such as ASCII, and/or any other format. For example, in one implementation log file 800 may be stored in a proprietary format that is not readily deciphered unless log file 800 is opened in environment 165. In addition, log file 800 may be encrypted or obfuscated.

In either case, computing environment 165 may use the information, such as information 850, to revert a data set to a previous version of the data set, such as a previous revision event or the original data set. For example, referring to log file 800, three revision events that occurred are indicated by revision manifestations 801-803, where revision manifestation 801 is the most recent revision event that occurred; revision manifestation 802 is the second most recent revision event that occurred; and revision manifestation 803 was the third most recent revision event that occurred.

Figure 9:
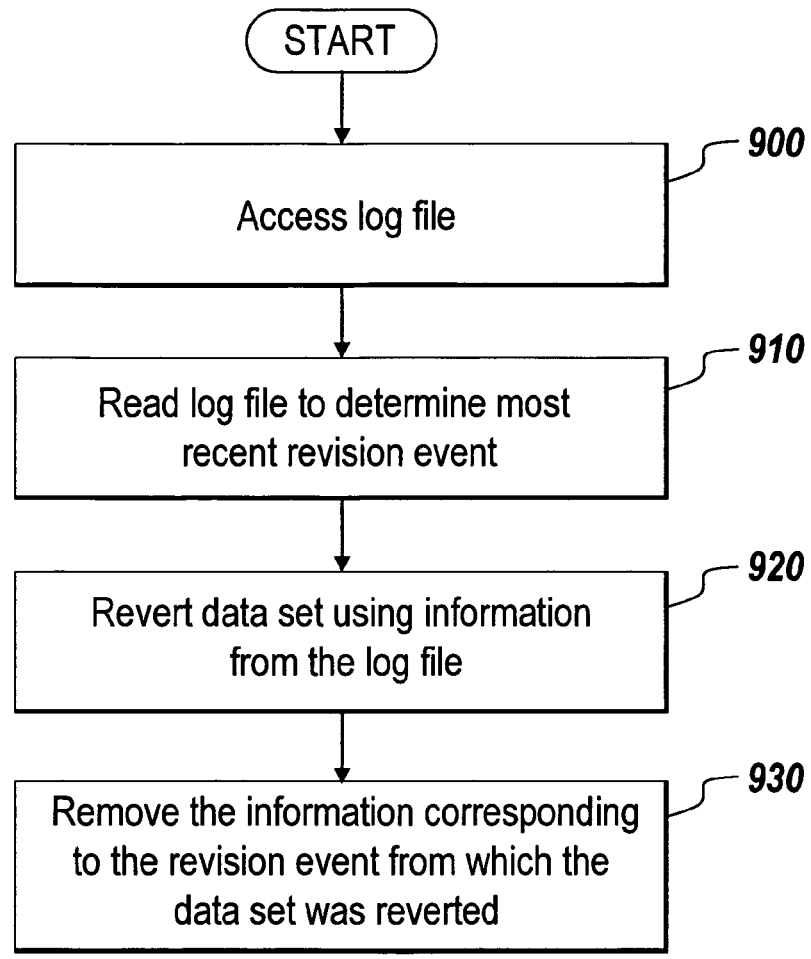
FIG. 9 is a flow diagram depicting exemplary processing for reverting a data set.

FIG. 9 is a flow diagram depicting exemplary processing for reverting a data set. Environment 165 may access log file 800 that was created for the data set (step 900). Environment 165 may read log file 800 to determine, which of the logged revision events occurred most recently (step 910). In the example of log file 800, environment 165 may determine that the most recent revision event corresponds to revision manifestation 801. Environment 165 may use the information corresponding to revision manifestation 801 to revert the data set to a previous revision event (step 920). Each time a user reverts to a previous revision event, environment 165 may remove information from log file 800 that was related to the revision event from which the data set was reverted (step 930).

A user may browse files in a directory and may view the properties of the files. The properties of the files may include a revision manifestation that provides a visual representation of the revision value. Environment 165 may create data structures, such as objects for each of the properties. When a property changes, environment 165 may update data in the property objects. For example, when a revision event has occurred, an object that contains the revision value is updated to record the occurrence of the revision event.

Figure 10:
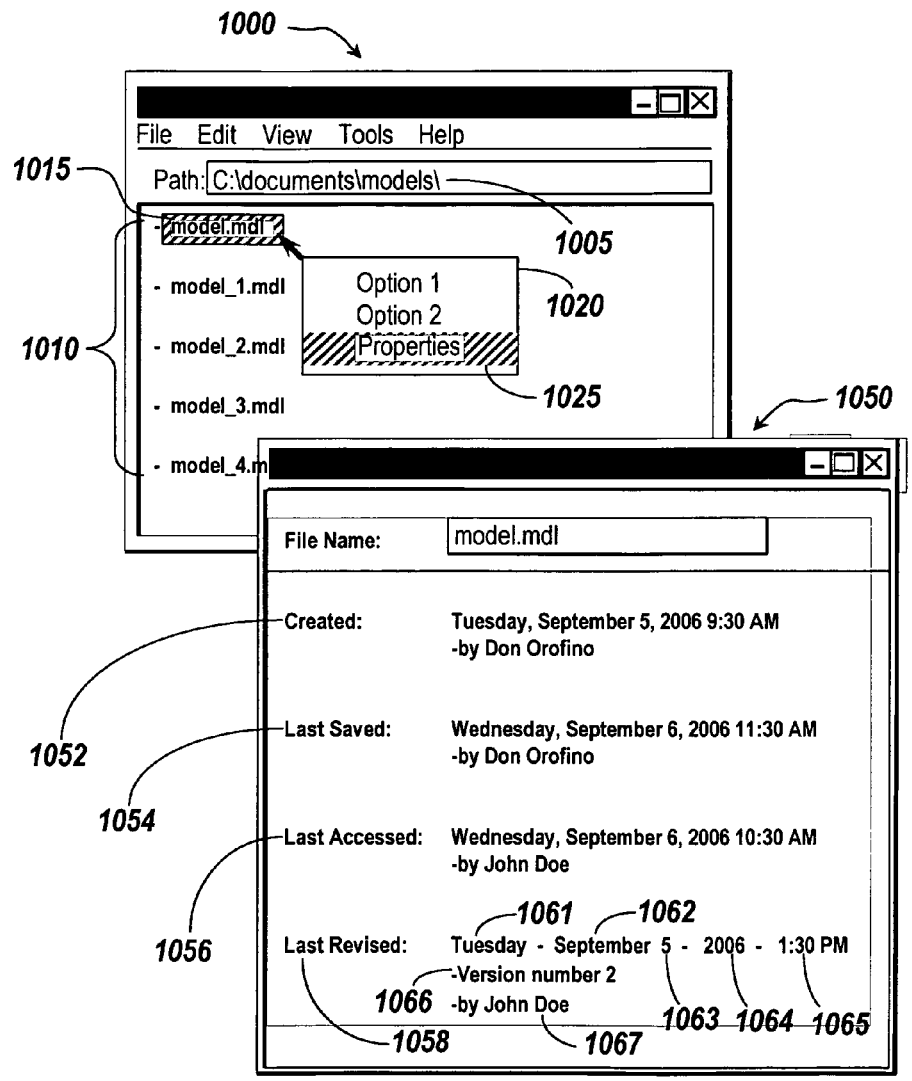
FIG. 10 depicts an exemplary window that provides a list of files associated with a directory and/or a window that includes properties associated with a file identified by the list.

FIG. 10 depicts an exemplary window 1000 that provides a list 1010 of files in a directory 1005. The user may view the properties of a file 1015 in list 1010. To view the properties of file 1015, the user may select file 1015 to bring up a menu 1020 of options. Menu 1020 of options may include a properties option 1025. The user may select properties option 1025 with a pointing device and a window 1050 may be displayed to the user.

Window 1050 may include a property 1052, a property 1054, a property 1056 and a property 1058. Property 1052 may identify when file 1015 was created. Property 1054 may identify when file 1015 was last saved. Property 856 may identify when file 1015 was last accessed. Property 1058 may identify when file 1015 was last revised. Property 1058 may use a day of the week 1061, a month 1062, a day of the month 1063, a year 1064, a time 1065, a revision number 1066, a user name 1067, etc., to provide a user with information related to the revision. Property 1058 may be provided by environment 165 as a revision manifestation to represent the revision value. The revision value is determined by environment 165, as discussed herein.

To display properties 1052, 1054, 1056 and 1058, code that generates window 1050 may read the data structures (e.g., objects) provided by environment 165 that contain property information. Code that generates window 1050 may format the property information in the data structures to present the data to the user in window 1050. Alternatively, environment 165 may insert the property information into the data set and code that generates window 1050 may access the data set to read the property information. For example, environment 165 may insert a file header into a file that contains property information relating to properties 1052, 1054, 1056 and 1058 and code that generates window 1050 may access the header file and display the information contained in the header file in window 1050.

Alternative embodiments that allow a user to configure requirements for determining whether a change qualifies as revision events may also allow a user to select which revision events are displayed to a user using a revision manifestation. For example, a filtering mechanism may be provided that prevents revision manifestations from being displayed that are associated with a particularly user, revision event, change amount, type of revision, etc. In addition, alternative embodiments may also allow a user to specify which graphical indicators are displayed. For example, multiple graphical indicators may be displayed that are related to revision events in the data set. Distinct graphical indicators may be provided for each user who makes a revision to the data, a magnitude of the revision, a type of revision, etc. As such, the user can, for example, display only graphical indicators that relate to a particular user, revision event, change type, or revision magnitude.

Exemplary embodiments may be provided as one or more programs readable by a computing device embodied on or in one or more mediums. The mediums may be, but are not limited to a hard disk, a compact disc, a digital versatile disc, a flash memory card, a Programmable Read Only Memory (PROM), a Random Access Memory (RAM), a Read Only Memory (ROM), a magnetoresistive random-access memory (MRAM), a magnetic tape, the genome in a cell nucleus, etc.

The computer-readable programs may be implemented in any programming language. Some examples of languages that may be used include Python, C, C++, C#, JAVA, Javascript, etc. Further, the computer readable programs may be implemented in a hardware description language such as Verilog or very high-speed integrated circuit description language (VHDL). The software programs may be stored on or in one or more mediums as object code.

Exemplary implementations may provide a revision value that reflects a revision event. For example, a revision value may not be associated with a file unless the revision value meets or exceeds a threshold, such as a threshold that identifies a revision event for the file.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 1B, 7 and 9, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 1A and 2 depending on specific deployments and/or applications. Further, disclosed implementations may not be limited to any specific combination of hardware and/or software.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed:

1. A method comprising:
obtaining an executable graphical model,
the executable graphical model including one or more graphical elements,
the one or more graphical elements, respectively, perform a simulation operation when the executable graphical model is executed, and
the obtaining being performed by a computing device;
receiving a user input specifying a criterion,
the criterion indicating a requirement for determining an occurrence of a revision event,
the revision event being associated with the executable graphical model, and
the receiving being performed by the computing device;
detecting a first modification associated with the executable graphical model,
the detecting the first modification being performed by the computing device;
evaluating the first modification with respect to the criterion,
the evaluating the first modification being performed by the computing device;
determining, based on the evaluating the first modification with respect to the criterion, that the first modification does not satisfy the requirement,
a revision value, associated with the executable graphical model, not being updated based on determining that the first modification does not satisfy the requirement, and
the determining that the first modification does not satisfy the requirement being performed by the computing device;
detecting a second modification associated with the executable graphical model,
the detecting the second modification being performed by the computing device;
evaluating the second modification with respect to the criterion,
the evaluating the second modification being performed by the computing device;
determining, based on the evaluating the second modification with respect to the criterion, that the second modification satisfies the requirement,
the determining that the second modification satisfies the requirement being performed by the computing device; and
updating the revision value, associated with the executable graphical model, based on determining that the second modification satisfies the requirement,
the revision value indicating that the revision event has occurred, and
the updating being performed by the computing device.

2. The method of claim 1, the method further comprising:
providing, for display, information, to a user, to indicate whether the revision event has occurred,
where the information is related to the revision value.

3. The method of claim 1, wherein the user input specifies a change type related to the executable graphical model.

4. The method of claim 1, wherein the user input specifies a change amount,
the change amount being related to the executable graphical model.

5. The method of claim 1, wherein the updated revision value indicates when the revision event occurred.

6. A system comprising:
a processor to:
obtain an executable graphical model,
the executable graphical model including one or more graphical elements, and
the one or more graphical elements, respectively, perform a simulation operation when the executable graphical model is executed;
receive a user input specifying a criterion,
the criterion indicating a requirement for determining an occurrence of a revision event,
the revision event being associated with the executable graphical model;
detect a first modification associated with the executable graphical model;
evaluate the first modification with respect to the criterion;
determine, based on the evaluating the first modification with respect to the criterion, that the first modification does not satisfy the requirement,
a revision value, associated with the executable graphical model, not being updated based on determining that the first modification does not satisfy the requirement;
detect a second modification associated with the executable graphical model;
evaluate the second modification with respect to the criterion;
determine, based on the evaluating the second modification with respect to the criterion, that the second modification satisfies the requirement; and
update the revision value, associated with the executable graphical model, based on determining that the second modification satisfies the requirement; and
a memory for storing the revision value associated with the executable graphical model.

7. The system of claim 6, where the processor is further to:
provide a menu to allow a user to specify the user input.

8. The system of claim 7, wherein the requirement represents a change amount associated with determining the occurrence of the revision event.

9. The system of claim 7, wherein the user input specifies a change type associated with determining the occurrence of the revision event.

10. The system of claim 6, wherein the updated revision value indicates when the revision event occurs.

11. A non-transitory computer-readable medium storing instructions, the instructions comprising:
one or more instructions that, when executed by a processor, cause the processor to:
obtain an executable graphical model,
the executable graphical model including one or more graphical elements, and
the one or more graphical elements, respectively, perform a simulation operation when the executable graphical model is executed; receive a user input specifying a criterion,
the criterion indicating a requirement for determining the occurrence of a revision event,
the revision event being associated with the executable graphical model;
detect a first modification associated with the executable graphical model;
evaluate the first modification with respect to the criterion;

determine, based on the evaluating the first modification with respect to the criterion, that the first modification does not satisfy the requirement,
a revision value, associated with the executable graphical model, not being updated based on determining that the first modification does not satisfy the requirement;
detect a second modification associated with the executable graphical model;
evaluate the second change with respect to the criterion;
determine, based on the evaluating the second modification with respect to the criterion, that the second modification satisfies the requirement; and
update the revision value, associated with the graphical model, based on determining that the second modification satisfies the requirement,
the revision value indicating that the revision event has occurred.

12. The non-transitory computer-readable medium of claim 11, where the instructions further comprise:
one or more instructions that, when executed by the processor, cause the processor to:
display information,
the displaying providing an indication to the user of whether the revision event has occurred.

13. The non-transitory computer-readable medium of claim 11, where the instructions further comprise:
one or more instructions that, when executed by the processor, cause the processor to:
provide an application program interface (API) to distribute the revision value to a destination.

14. The non-transitory computer-readable medium of claim 11, where the instructions further comprise:
one or more instructions that, when executed by the processor, cause the processor to:
monitor the executable graphical model for the revision event to determine when data associated with the executable graphical model is changed; and
where the one or more instructions to detect the first modification include:
one or more instructions that, when executed by the processor, cause the processor to:
detect the first modification based on the monitoring.

15. The non-transitory computer-readable medium of claim 11, wherein the user input specifies a change type related to the executable graphical model.

16. The non-transitory computer-readable medium of claim 15, wherein the change type relates to at least one of:
a graphical element insertion,
a graphical element deletion,
a graphical element replacement,
one or more annotation changes,
one or more graphical element position changes,
one or more parameter value changes, or
one or more executable graphical model attribute changes.

17. The non-transitory computer-readable medium of claim 11, wherein the user input specifies a change amount related to the executable graphical model.

18. The non-transitory computer-readable medium of claim 11, where the instructions further comprise:
one or more instructions that, when executed by the processor, cause the processor to:
provide the updated revision value for display.

19. The non-transitory computer-readable medium of claim 11, wherein the updated revision value indicates when the second modification occurred.

20. The non-transitory computer-readable medium of claim 19, wherein the revision value comprises at least one of:
a date,
a user name,
a revision number, or
a time.

21. The non-transitory computer-readable medium of claim 11, wherein the revision value corresponds to a magnitude of change, and
where the instructions further comprise:
one or more instructions that, when executed by the processor, cause the processor to:
indicate the magnitude of the change graphically.

22. The non-transitory computer-readable medium of claim 11, where the instructions further comprise:
one or more instructions that, when executed by the processor, cause the processor to:
store information associated with the occurrence of the revision event when the revision value is updated.

23. The non-transitory computer-readable medium of claim 22, where the instructions further comprise:
one or more instructions that, when executed by the processor, cause the processor to:
revert the revision value and the executable graphical model to a previous state based on the information associated with the occurrence of the revision event.

24. The non-transitory computer-readable medium of claim 11, wherein the detecting the second modification and the updating are performed with respect to a portion of data associated with the executable graphical model.

25. The non-transitory computer-readable medium of claim 11, wherein the executable graphical model comprises information related to at least one of:
a creation of another executable graphical model, or
a modification of the other executable graphical model.

26. The non-transitory computer-readable medium of claim 25, wherein the information identifies one or more options for generating code from the executable graphical model.

* * * * *